United States Patent [19]

Testa et al.

[11] Patent Number: 5,265,218
[45] Date of Patent: Nov. 23, 1993

[54] BUS ARCHITECTURE FOR INTEGRATED DATA AND VIDEO MEMORY

[75] Inventors: James Testa, Mountain View; Andreas Behtolsheim, Stanford; Edward Frank, Portola Valley; Trevor Creary, Mountain View; David Emberson, Santa Cruz; Shawn F. Storm; Bradley Hoffert, both of Mountain Valley, all of Calif.

[73] Assignee: Sun Microsystems, Inc., Mountain View, Calif.

[21] Appl. No.: 886,671

[22] Filed: May 19, 1992

[51] Int. Cl.⁵ ............................................. G06F 13/16
[52] U.S. Cl. .................................. 395/325; 395/425; 364/DIG. 1; 364/238.4; 364/240.2; 364/243; 364/243.7
[58] Field of Search ............... 395/325, 425, 162, 164; 340/700, 789, 798, 799

[56] References Cited

U.S. PATENT DOCUMENTS

| | | | |
|---|---|---|---|
| 4,181,933 | 1/1980 | Benysek | 395/425 |
| 4,628,467 | 12/1986 | Nishi et al. | 340/799 |
| 4,912,632 | 3/1990 | Gach et al. | 395/425 |
| 4,959,793 | 9/1990 | Suzuki | 395/164 |
| 4,980,828 | 12/1990 | Kapcio et al. | 364/413.13 |
| 4,992,960 | 2/1991 | Yamaoka et al. | 395/164 |
| 5,185,859 | 2/1993 | Guttag et al. | 395/164 |

*Primary Examiner*—Debra A. Chun
*Attorney, Agent, or Firm*—Blakely Sokoloff Taylor & Zafman

[57] ABSTRACT

A bus architecture and protocol for integrated data and video memory. A high speed dedicated memory bus is coupled to a memory controller. The memory controller is in turn coupled to a multiple processor bus interconnecting one or more processors. Single in-line memory modules (SIMMs) incorporating dynamic random access memory (DRAM), video RAM (VRAM), and static nonvolatile RAM (SRAM) are coupled to the memory bus. Bus control signals forming a bus protocol, and address and data lines from the memory controller are shared by all memory modules operating on the memory bus. Certain control signals invoke specific operations on memory modules or are ignored, depending on the type of memory module receiving the control signal. The memory modules incorporate the consistent protocol by virtue of a consistent control signal pin out. The SIMMs further incorporate buffering and conversion functions, thereby relieving the memory controller of service overhead associated with these functions. Integrating all forms of memory into a single data and video memory architecture permits a highly functional dedicated memory bus to be connected to the computer system.

20 Claims, 22 Drawing Sheets typical vram cas before ras refresh cycle

0xrn8 (ioa[11]=1)
Auto increment address load cycle

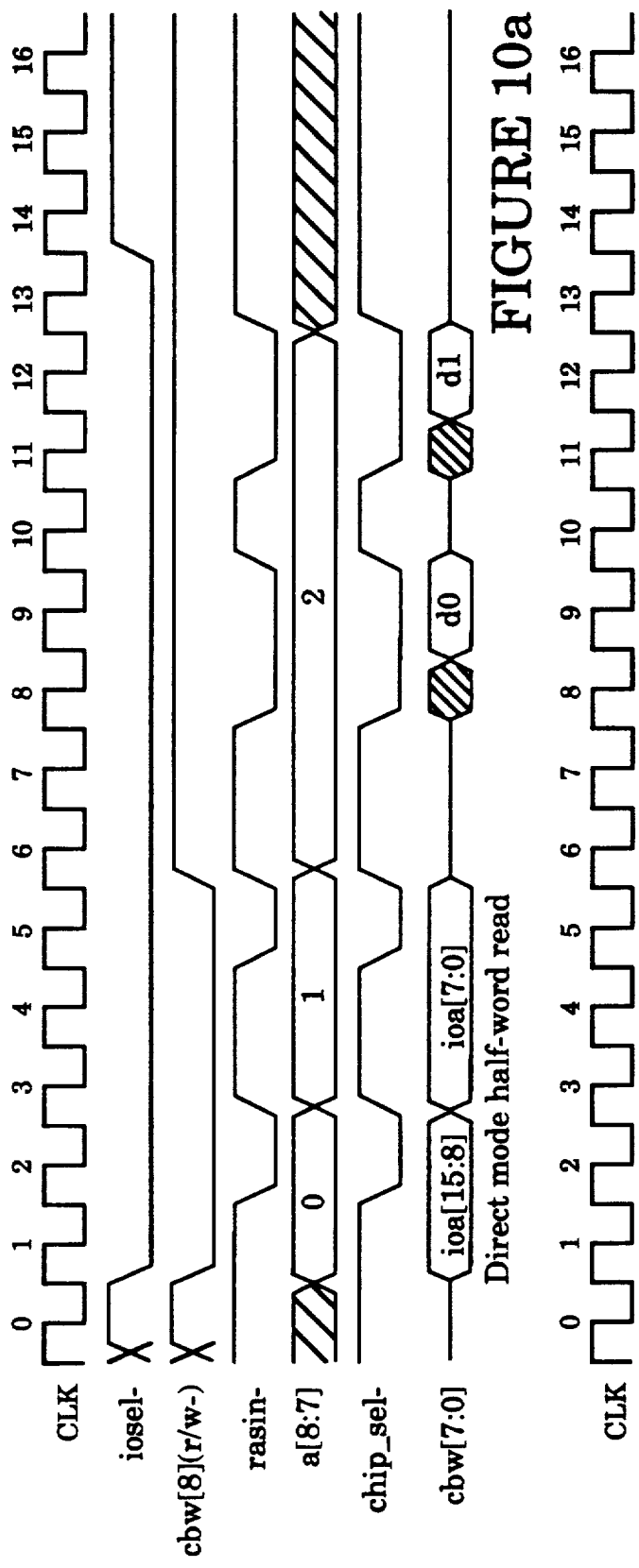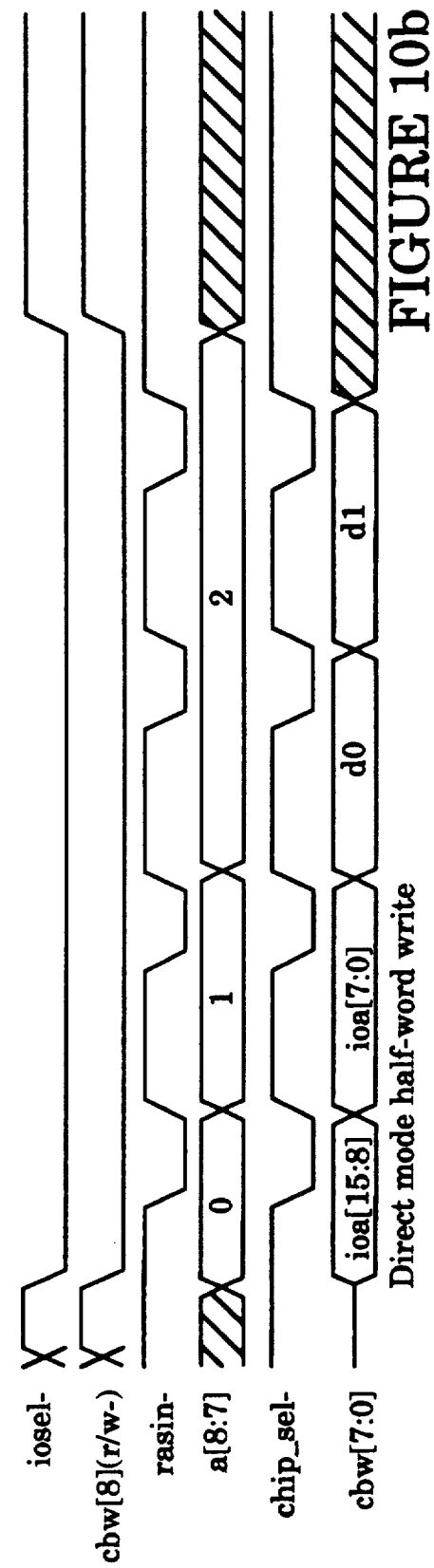

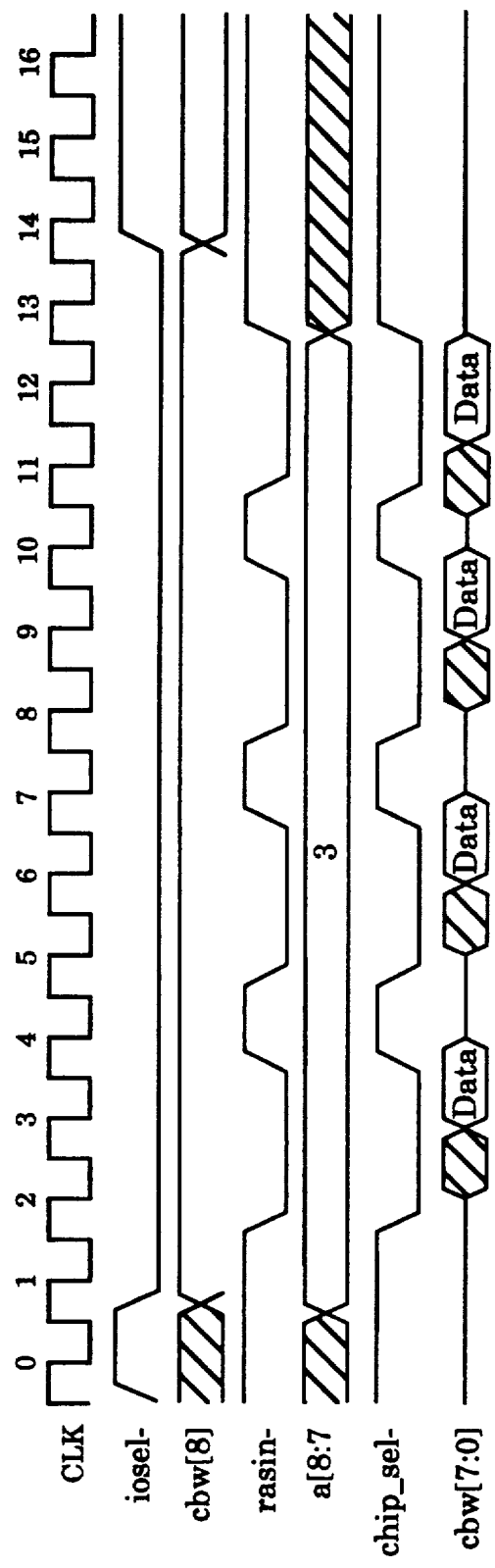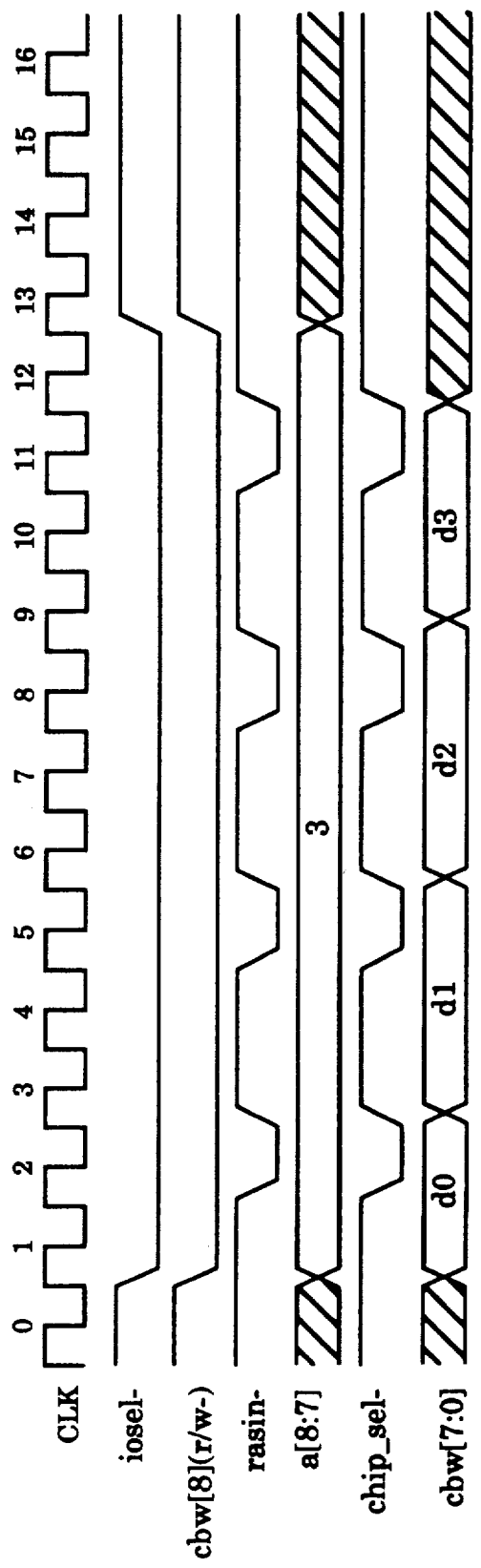

VBUSY_PROTOCOL (VBC CYCLE IN PROGRESS, EMC BLOCKED)

VBUSY_PROTOCOL (VBC CYCLE IN PROGRESS, EMC COMPLETES CURRENT TRANSACTION)

FIGURE 21

| VBusy | CAS | RAS | | Slot# & Type |
|---|---|---|---|---|
| VBusy | Cas0 | Ras0 | side a : ECC DRAM - d[127:64] | Dram |
|  | Cas1 | Ras0 | side b : ECC DRAM - d[63:0] | Slot 0 |
| VBusy0 | Cas0 | Ras4 | side a | Dram or Vram |
|  | Cas1 | Ras4 | side b | Slot 1 |
|  | Cas0 | Ras1 | side a | Dram |
|  | Cas1 | Ras1 | side b | Slot 2 |
| VBusy1 | Cas0 | Ras5 | side a | Dram or Vram |
|  | Cas1 | Ras5 | side b | Slot 3 |
|  | Cas0 | Ras2 | side a | Dram |
|  | Cas1 | Ras2 | side b | Slot 4 |
| VBusy0 | Cas0 | Ras6 | side a : (e.g. 128b FB - d[127:64]) | Dram or Vram |
|  | Cas1 | Ras6 | side b : (e.g. 128b FB - d[63:0]) | Slot 5 |
|  | Cas0 | Ras3 | side a | Dram |
|  | Cas1 | Ras3 | side b | Slot 6 |
| VBusy1 | Cas0 | Ras7 | side a : (e.g. 256b FB - d[127:0]) | Dram or Vram |
|  | Cas1 | Ras7 | side b : (e.g. 256b FB - d[127:0]) | Slot 7 |

Top Side of Motherboard

| D< 0>   | D< 0>   | D< 32>  | D< 32>  |
|---------|---------|---------|---------|
| D< 1>   | D< 1>   | D< 33>  | D< 33>  |
| D< 2>   | D< 2>   | D< 34>  | D< 34>  |
| D< 3>   | D< 3>   | D< 35>  | D< 35>  |
| D< 4>   | D< 4>   | D< 36>  | D< 36>  |
| D< 5>   | D< 5>   | D< 37>  | D< 37>  |
| D< 6>   | D< 6>   | D< 38>  | D< 38>  |
| D< 7>   | D< 7>   | D< 39>  | D< 39>  |
| D< 8>   | D< 8>   | D< 40>  | D< 40>  |
| D< 9>   | D< 9>   | D< 41>  | D< 41>  |
| D< 10>  | D< 10>  | D< 42>  | D< 42>  |
| D< 11>  | D< 11>  | D< 43>  | D< 43>  |
| D< 12>  | D< 12>  | D< 44>  | D< 44>  |
| D< 13>  | D< 13>  | D< 45>  | D< 45>  |
| D< 14>  | D< 14>  | D< 46>  | D< 46>  |
| D< 15>  | D< 15>  | D< 47>  | D< 47>  |
| D< 16>  | D< 16>  | D< 48>  | D< 48>  |
| D< 17>  | D< 17>  | D< 49>  | D< 49>  |
| D< 18>  | D< 18>  | D< 50>  | D< 50>  |
| D< 19>  | D< 19>  | D< 51>  | D< 51>  |
| D< 20>  | D< 20>  | D< 52>  | D< 52>  |
| D< 21>  | D< 21>  | D< 53>  | D< 53>  |
| D< 22>  | D< 22>  | D< 54>  | D< 54>  |
| D< 23>  | D< 23>  | D< 55>  | D< 55>  |
| D< 24>  | D< 24>  | D< 56>  | D< 56>  |
| D< 25>  | D< 25>  | D< 57>  | D< 57>  |
| D< 26>  | D< 26>  | D< 58>  | D< 58>  |
| D< 27>  | D< 27>  | D< 59>  | D< 59>  |
| D< 28>  | D< 28>  | D< 60>  | D< 60>  |
| D< 29>  | D< 29>  | D< 61>  | D< 61>  |
| D< 30>  | D< 30>  | D< 62>  | D< 62>  |
| D< 31>  | D< 31>  | D< 63>  | D< 63>  |
| CBW< 0> | CBW< 0> | CBW< 4> | CBW< 4> |
| CBW< 1> | CBW< 1> | CBW< 5> | CBW< 5> |
| CBW< 2> | CBW< 2> | CBW< 6> | CBW< 6> |
| CBW< 3> | CBW< 3> | CBW< 7> | CBW< 7> |
| ROE*    | ROE*    | BUSY*   | BUSY*   |
| VIRQ*   | VIRQ*   | SIRQ*   | SIRQ*   |
| RAS1*   | RAS1*   | RAS0*   | RAS0*   |
| CAS1*   | CAS1*   | CAS0*   | CAS0*   |
| A< 1>   | A< 1>   | A< 0>   | A< 0>   |
| A< 3>   | A< 3>   | A< 2>   | A< 2>   |
| A< 5>   | A< 5>   | A< 4>   | A< 4>   |

J0301

CONN2000

*FIGURE 22a*

| | | | |
|---|---|---|---|
| A< 7> | A< 7> | A< 6> | A< 6> |
| A< 9> | A< 9> | A< 8> | A< 8> |
| A< 11> | A< 11> | A< 10> | A< 10> |
| MEMRESET* | MEMRESET* | WE* | WE* |
| IOSEL* | IOSEL* | MCLK | MCLK |
| D< 64> | D< 64> | D< 96> | D< 96> |
| D< 65> | D< 65> | D< 97> | D< 97> |
| D< 66> | D< 66> | D< 98> | D< 98> |
| D< 67> | D< 67> | D< 99> | D< 99> |
| D< 68> | D< 68> | D< 100> | D< 100> |
| D< 69> | D< 69> | D< 101> | D< 101> |
| D< 70> | D< 70> | D< 102> | D< 102> |
| D< 71> | D< 71> | D< 103> | D< 103> |
| D< 72> | D< 72> | D< 104> | D< 104> |
| D< 73> | D< 73> | D< 105> | D< 105> |
| D< 74> | D< 74> | D< 106> | D< 106> |
| D< 75> | D< 75> | D< 107> | D< 107> |
| D< 76> | D< 76> | D< 108> | D< 108> |
| D< 77> | D< 77> | D< 109> | D< 109> |
| D< 78> | D< 78> | D< 110> | D< 110> |
| D< 79> | D< 79> | D< 111> | D< 111> |
| D< 80> | D< 80> | D< 112> | D< 112> |
| D< 81> | D< 81> | D< 113> | D< 113> |
| D< 82> | D< 82> | D< 114> | D< 114> |
| D< 83> | D< 83> | D< 115> | D< 115> |
| D< 84> | D< 84> | D< 116> | D< 116> |
| D< 85> | D< 85> | D< 117> | D< 117> |
| D< 86> | D< 86> | D< 118> | D< 118> |
| D< 87> | D< 87> | D< 119> | D< 119> |
| D< 88> | D< 88> | D< 120> | D< 120> |
| D< 89> | D< 89> | D< 121> | D< 121> |
| D< 90> | D< 90> | D< 122> | D< 122> |
| D< 91> | D< 91> | D< 123> | D< 123> |
| D< 92> | D< 92> | D< 124> | D< 124> |
| D< 93> | D< 93> | D< 125> | D< 125> |
| D< 91> | D< 91> | D< 126> | D< 126> |
| D< 92> | D< 92> | D< 127> | D< 127> |
| CBW< 8> | CBW< 8> | CBW< 12> | CBW< 12> |
| CBW< 9> | CBW< 9> | CBW< 13> | CBW< 13> |
| CBW< 10> | CBW< 10> | CBW< 14> | CBW< 14> |
| CBW< 11> | CBW< 11> | CBW< 15> | CBW< 15> |

*FIGURE 22b*

MEMORY SIMM BUS - (DSIMM, VSIMM, AND NVSIMM)

| PIN | DESCRIPTION |
|---|---|
| D<0-127> | DATA BITS |
| A<0-11> | ADDRESS BITS |
| CBW<0-7> | CHECK BIT WRITE ENABLES/DATA BUS TO ON BOARD DEVICES USED IN VIDEO SIMM |
| CBW<8-15> | CHECK BIT WRITE ENABLES |
| CAS<0-1>* | COLUMN ADDRESS STROBES |
| RAS<0-1>* | ROW ADDRESS STROBES |
| VBSY* | VIDEO FRAME BUFFER BUSY SIGNAL - INDICATES THAT FRAME BUFFER IS BUSY DOING REFRESH OR RELOAD OPERATIONS |
| SIRQ* | INDICATES THAT THE BATTERY ON THE NVSIMM IS LOW |
| VIRQ* | VIDEO INTERRUPT |
| WE* | WRITE ENABLE |
| MRST* | RESET SIGNAL |
| MCLK | MBUS CLOCK - SENT TO THE VIDEO BUFFER |
| IOSEL* | DIFFERENTIATES BETWEEN MEMORY ADDRESS SPACE AND I/O ADDRESS SPACE |
| ROE* | CURRENTLY USED BY VSIMM TO GENERATE DTOE SIGNALS. OE* ON THE DSIMMS IS TIED TO GROUND |

VIDEO OUTPUT - (CONTROL SIGNALS FOR VSIMM ONLY)

| PIN | DESCRIPTION |
|---|---|
| IOB_0,1 | BLUE DAC OUTPUT |
| IOBB_0,1 | BLUE DAC RETURN |
| IOG_0,1 | GREEN DAC OUTPUT |
| IOGB_0,1 | GREEN DAC RETURN |
| IOR_0,1 | RED DAC OUTPUT |
| IORB_0,1 | RED DAC RETURN |
| SNS<0-2> | UART BUS |
| SYNC_0,1* | SYNC SIGNAL |
| DACCLK_0,1 | CLOCK INPUT FOR DAC |
| SERIAL WRITE | SERIAL WRITE SIGNAL TO MONITOR |
| SERIAL READ | SERIAL READ SIGNAL TO MONITOR |

*FIGURE 23*

Pin Numbering -

| Base | +1 | +2 | +3 | +4 | +5 | +6 | +7 | +8 |
|---|---|---|---|---|---|---|---|---|
| 0   | GND   | GND    | D0     | D7     | D1     | D6     | D2     | D5     |
| 8   | D3    | D4     | D32    | D39    | D33    | D38    | D34    | D37    |
| 16  | VCC   | VCC    | D35    | D36    | D8     | D15    | D9     | D14    |
| 24  | D10   | D13    | D11    | D12    | D40    | D47    | D41    | D46    |
| 32  | GND   | GND    | D42    | D45    | D43    | D44    | D16    | D23    |
| 40  | D17   | D22    | D18    | D21    | D19    | D20    | D48    | D55    |
| 48  | VCC   | VCC    | D49    | D54    | D50    | D53    | D51    | D52    |
| 56  | D24   | D31    | D25    | D30    | D26    | D29    | D27    | D28    |
| 64  | GND   | GND    | D56    | D63    | D57    | D62    | D58    | D61    |
| 72  | D59   | D60    | CBW0   | CBW7   | CBW1   | CBW6   | CBW2   | CBW5   |
| 80  | VCC   | VCC    | CBW3   | CBW4   | -CAS0  | -CAS1  | -RAS0  | -RAS1  |
| 88  | -ROE  | -BUSY  | -VIRQ  | BatFail| A0     | A1     | A2     | A3     |
| 96  | A4    | A5     | GND    | GND    | GND    | GND    | A6     | A7     |
| 104 | A8    | A9     | A10    | A11    | -MRST  | -WE    | -IOSEL | MCLK   |
| 112 | GND   | GND    | GND    | GND    | CBW8   | CBW15  | VCC    | VCC    |
| 120 | CBW9  | CBW14  | CBW10  | CBW13  | CBW11  | CBW12  | D64    | D71    |
| 128 | D65   | D70    | D66    | D69    | D67    | D68    | GND    | GND    |
| 136 | D96   | D103   | D97    | D102   | D98    | D101   | D99    | D100   |
| 144 | D72   | D79    | D73    | D78    | D74    | D77    | VCC    | VCC    |
| 152 | D75   | D76    | D104   | D111   | D105   | D110   | D106   | D109   |
| 160 | D107  | D108   | D80    | D87    | D81    | D86    | GND    | GND    |
| 168 | D82   | D85    | D83    | D84    | D112   | D119   | D113   | D118   |
| 176 | D114  | D117   | D115   | D116   | D88    | D95    | VCC    | VCC    |
| 184 | D89   | D94    | D90    | D93    | D91    | D92    | D120   | D127   |
| 192 | D121  | D126   | D122   | D125   | D123   | D124   | GND    | GND    |

Video Output -

| Base | +1 | +2 | +3 | +4 | +5 | +6 | +7 | +8 |
|---|---|---|---|---|---|---|---|---|
| 0  | VCC    | VCC    | VCC    | VCC    | IOR-0   | IOR-1   | IORB-0 | IORB-1 |
| 8  | IOG-0  | IOG-1  | IOGB-0 | IOGB-1 | IOB-0   | IOB-1   | IOBB-0 | IOBB-1 |
| 16 | GND    | GND    | GND    | GND    | SYNC-0* | SYNC-1* | GND    | GND    |
| 24 | SNS<0> | NC     | SNS<1> | NC     | SNS<2>  | NC      | DacClk-0 | DacClk-1 |
| 32 | VCC    | VCC    | VCC    | VCC    |         |         |        |        |

FIGURE 24

BUS ARCHITECTURE FOR INTEGRATED DATA AND VIDEO MEMORY

RELATED APPLICATIONS

This application is related to U.S. patent application Ser. No. 07/886,045, entitled "Multiple Bus Architecture", filed May 19, 1992.

BACKGROUND OF THE INVENTION

1. Field of the Invention

The present invention relates to the field of computer systems and associated memory structures. More particularly, the present invention relates to a bus architecture designed specifically for integrating data and video random access memory (RAM) modules.

2. Art Background

General purpose computer systems usually contain one or more buses for interconnecting the various active components operating within the computer system. A bus may be generally described as a group of signal lines over which information is transferred from any of several sources to any of several destinations. Physically, a bus is a collection of wires routed on the computer motherboard and terminating at sockets into which may be inserted a variety of active devices. The active devices are usually constructed in modular form and generate and receive the signals transmitted over the collection of wires forming the bus. Well known bus systems include VME bus ®, microchannel ®, multibus ®, MBus, and SBus.

Typically, devices communicating over a bus utilize a set of control signals referred to collectively as a bus protocol to coordinate transfer of signals transmitted over the bus. Many of such control signals are common to each of the above named bus systems and to bus systems generally. However, most bus protocols further include a number of specific control signals permitting manipulation of data transmitted over the bus in a manner unique to the particular bus employing such signal. For example, some buses may be particularly designed to accommodate a number of bus masters, and which bus operation must accommodate signals issued by the masters seeking to control any of several slaves operating on the bus. Alternatively, another bus may be more generally designed to accommodate any of several arbitrary devices operating on the bus, and does not favor any particular operating characteristics of the devices connected to the bus. Further, all buses are constrained to operate within the physical design limits of the bus, in terms of bandwidth, data rate, and clock frequency.

Also in the past, memory devices operating on a bus were typically grouped into modules according to the type of memory function to be served. Typically, one form of memory, for example main memory, would be coupled to the bus to which is connected the processor, or processors in a multiprocessing system processors. Depending on the specific organization of such a computer system, additional memory components forming memory for other purposes, such as non-volatile memory or memory dedicated to video frame buffers, may be grouped into modules coupled to buses other than the bus connecting main memory to the processors. Further, additional memory may be later added to a computer system and be grouped onto yet a different bus.

In such a computer system having memory distributed over a number of buses, access to the various memory modules can be hampered by the number of data paths, controllers and interface chips through which signals must travel from a processor seeking to retrieve or write data from or to a memory device operating on a remote bus system. Moreover, having distributed memory modules requires more area within the computer system in order to accommodate the several bus data paths and memory groupings. Another consequence of having distributed memory groupings is that the memory modules inserted in such a memory group are specific to that memory group and cannot be interchanged with memory modules from another grouping. That is to say, a memory module from main memory generally cannot be interchanged with a memory module for a video frame buffer operating on a different bus, principally because the control signals to the video frame buffer memory are different from the control signals directed to the main memory module. The generic problem in all of these various distributed bus systems is that the number of signal lines to accommodate the various types of control signals and signal conditions can become large. This adds to the general complexity, and therefore the cost and reliability of the overall computer system.

SUMMARY OF THE INVENTION

A bus architecture for integrated data and video memory is disclosed. A high speed dedicated memory bus is coupled to a memory controller. The memory controller is in turn coupled to a multiple processor bus interconnecting one or more processors. Memory modules in the form of low profile single-end-line-memory-modules (SIMM) incorporating dynamic random access memory (DRAM), video RAM (VRAM), and static non-volatile RAM (SRAM) are coupled to the memory bus. Bus control signals and address and data lines from the memory controller are shared by all memory modules operating on the memory bus. Certain control signals invoke specific operations on memory modules, depending on the type of memory module receiving the control signal. Due to the high functionality of the VRAM SIMM memory modules, a plurality of check-bit-write bits provide a combination of write enable and access to I/O registers on the VRAM SIMM. A single busy line can be asserted by any memory module requiring the SIMM controller to back off and reaccess the memory module at a subsequent time.

The memory bus architecture is designed to match the memory bus band width to the bandwidth of the multiprocessor bus and the data rate of the processors coupled thereto.

The memory modules incorporated into the integrated data and video memory are constructed around a consistent protocol of control signals pin out. The VRAM SIMMs further incorporate video buffering and conversion functions, thereby relieving the memory controller of service overhead associated with these functions. The VRAM SIMM further incorporates a video output block in order to directly drive a video monitor. Multiple frame buffers may be accommodated by the integrated data and video memory bus.

Integrating all forms of memory into a single data and video memory architecture permits simplified, consistent access to memory modules, and therefore simplified updating of peripheral processes connected to the computer system. The SIMM modules incorporate a high number density connector, permitting high functionality to be incorporated into the SIMMS. The SIMMs are organized to permit memory expansion in full data path-width increments, and to accommodate higher capacity RAM chips when they become available.

BRIEF DESCRIPTION OF THE DRAWINGS

The present invention will be understood more fully from the detailed description given below and from the accompanying drawings of the preferred embodiment of the invention in which:

FIG. 10a is a timing diagram illustrating a direct address mode read cycle for a half word, according to the protocol of the present invention.

FIG. 10b is a timing diagram illustrating a direct address mode read cycle for a half word, according to the protocol of the present invention.

FIG. 11a is a timing diagram illustrating an indirect address mode read cycle for one or more words, according to the protocol of the present invention.

FIG. 11b is a timing diagram illustrating an indirect address mode write cycle for one or more words, according to the protocol of the present invention.

FIG. 21 illustrates the distribution of Column Access Strobe (CAS) and Row Access Strobe (RAS) control signals to all SIMM slots.

FIGS. 22a and 22b illustrate the high density connector used on each SIMM.

FIG. 23 is a table of the control signals used to implement the protocol for the integrated data and video memory bus.

FIG. 24 illustrates the pin numbering used in the high density SIMM connector.

DETAILED DESCRIPTION OF THE INVENTION

A bus architecture for integrated data and video memory is disclosed. In the following description, for purposes of explanation, specific numbers, times, signals etc., are set forth in order to provide a thorough understanding of the present invention. However, it will be apparent to one skilled in the art that the present invention may be practiced without these specific details. In other instances, well known circuits and devices are shown in block diagram form in order not to obscure the present invention unnecessarily.

The preferred embodiment of the integrated data and video memory bus is designed to be used with complimentary metal-oxide-semiconductor (CMOS) technology. As such, certain power specifications and timing protocols are optimized to reduce power consumption and to provide sufficient stabilization time of control signals drive by the CMOS devices and to provide sufficient stabilization time of control signals driven by the CMOS devices. It will be apparent, however, to those skilled in the art that the specifications can or may be changed without departing from the scope of the present invention. Further, throughout the following detailed description, certain bus lines will be described as being "active high" or "active low". This terminology will be used to indicate whether a particular bus control or data or address line in question is asserted or not, and therefore relevant or not to the bus operation. It will be apparent however, that the assertion of an active high or active low control signal is a matter of design choice. Although the preferred embodiment has been designed to maximize data transfer rate and accuracy of stability of control signals, it will be appreciated that changing the design of the bus to accommodate other alternatives to active high and active low is within the scope of the present invention.

Similarly, the preferred embodiment of the memory bus operates in a completely synchronous fashion, wherein all bus signals change on the rising edge of clock pulses. The synchronous design is desirable to achieve high data transfer rates, and synchronous bus designs enable simplified clock pulse edge detection. However, it will be appreciated that the use of the rising edge of the clock pulses is a matter of design choice, and that the present invention can be made synchronous upon the falling edge of clock pulses.

A. MEMORY SYSTEM—Memory Bus

Figure 1:
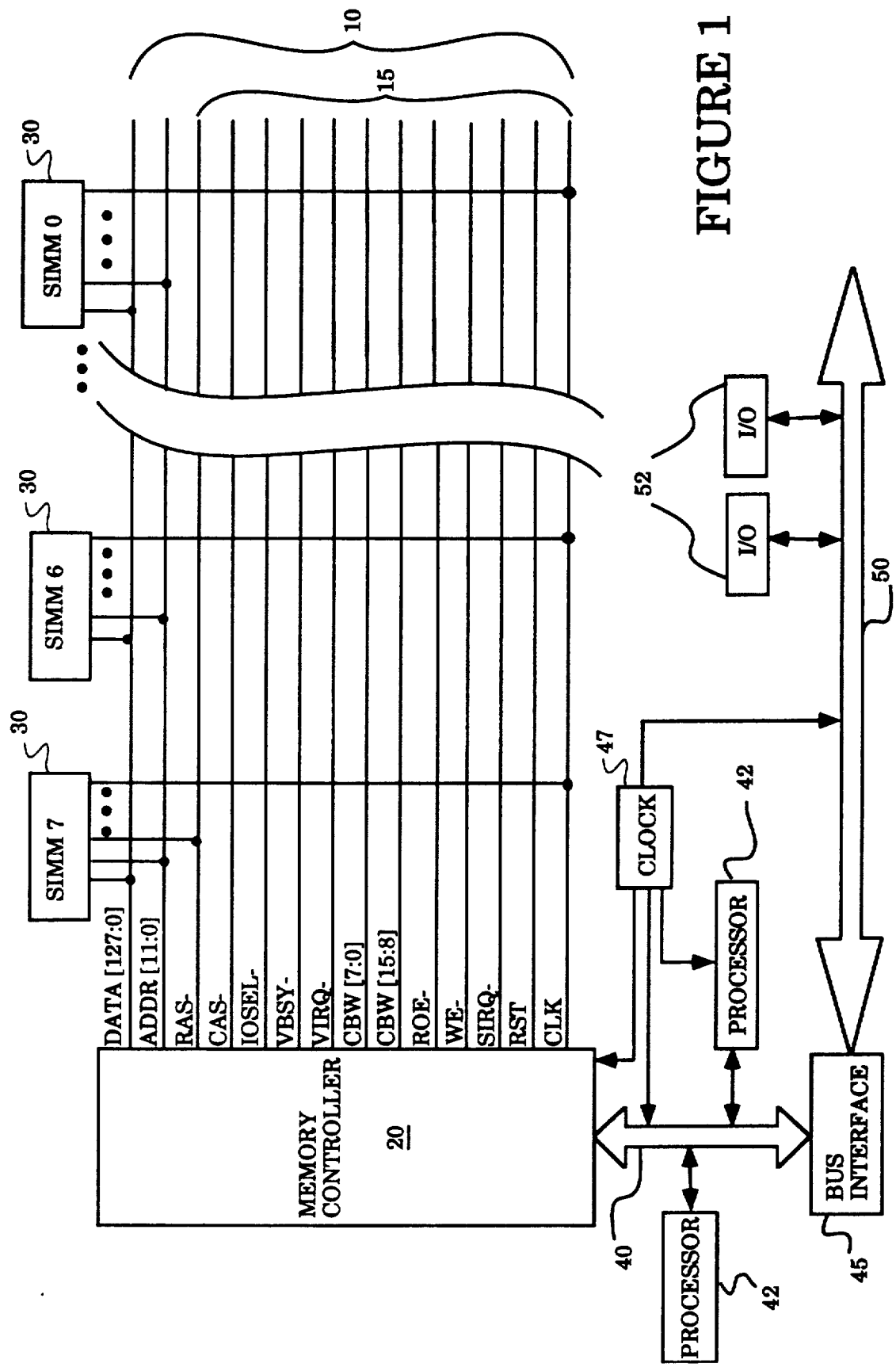
FIG. 1 is a block diagram of the integrated data and video memory bus.

Reference is now made to FIG. 1, wherein a block diagram overview of a multiple bus architecture in a multiple processor high performance computer system incorporating the integrated memory bus of the present invention are shown. The presently preferred embodiment may be found in certain of the computer systems manufactured by Sun Microsystems, Mountain View, Calif.

In FIG. 1, a multiplicity of time-multiplexed bus signal lines 10 form the memory bus. Signal lines 10 are routed from a memory controller 20 and coupled to a multiplicity of single in-line memory modules (SIMMS) 30. Signal lines 10 consist of address lines ADDR[11:0], data lines DATA[127:0], and a numerosity of control lines 15 which together permit memory controller to access SIMMs 30 operating on the bus according to the integrated memory protocol described herein. The function and effect of each of control signals 15 will be described in detail below. In order to flexibly accommodate different needs of different users in configuring computer systems, SIMMs 30 may consist of any of a variety of memory forms, including dynamic random access memory (DRAM), video RAM (VRAM), and nonvolatile static RAM (SRAM).

Throughout the following discussion, it is contemplated that any combination of the above types of memory will be coupled to the integrated memory bus. As will be described and demonstrated in terms of specific examples, the memory bus of the present invention incorporates uniform control signals and signal pin outs so that, with certain exceptions, SIMMs 30 may be arbitrarily placed in the SIMM slots.

Memory controller 20 is coupled to one or more processors 42 via a multiple processor bus 40. In the presently preferred embodiment, multiple processor bus 40 is an Mbus, as may be found in computer systems manufactured by Sun Microsystems, Mountain View, Calif., and as described in the Mbus Specification, Revision 1.1. A bus interface 45 couples bus 40 to a second, general purpose bus 50. In the presently preferred embodiment, general purpose bus 50 is an Sbus, as also may be found in computer systems manufactured by Sun Microsystems and as described in the Sbus Specification, Revision 1.1. However, other processor as well as general purpose buses are available, and are within the scope of the present invention. A system clock 47 distributes clock signals to all devices coupled to the memory bus, as well as the other buses 40 and 50. A variety of I/O and peripheral devices 52 may be intercoupled to bus 50, thus forming a complete computer system.

B. MEMORY SYSTEM—Memory Components

Figure 2:
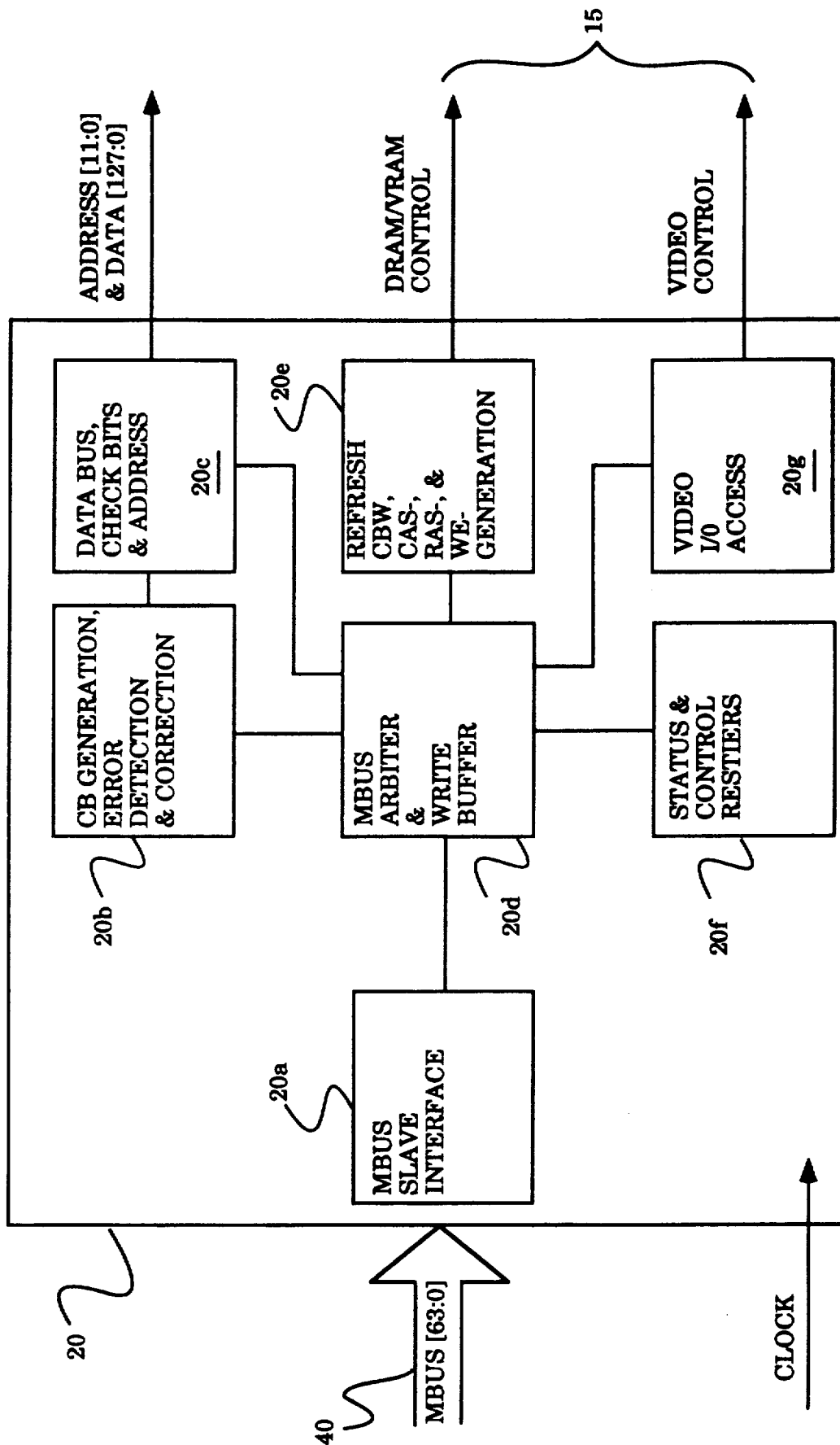
FIG. 2 is a block diagram of a memory controller for the integrated data and video memory bus in FIG. 1.

Reference is now made to FIG. 2, which illustrates a block diagram of the memory controller 20 used to control access to memory devices operating on the integrated data and video memory bus shown in FIG. 1. In FIG. 2, memory controller 20 receives address and data signals transmitted over multiple processor bus 40 through an MBus slave interface 20a. MBus slave interface 20a incorporates facilities to operate as an MBus slave only, and implements the full Level 2 MBus protocol. After being received by MBus slave interface 20a, data and address signals are subsequently transmitted to several internal logic blocks, and subsequently retransmitted to signal lines 10. It is further intended that memory controller 20 should include sufficient functionality to permit the memory bus to operate according the protocol described herein. The memory controller 20 of the presently preferred embodiment includes check-bit generation and error detection block 20b, data bus, check bits, and address block 20c, bus arbiter and write buffer 20c, generation of control signals and refresh block 20e, status and control registers 20f, and video I/O access block 20g.

Figure 3:
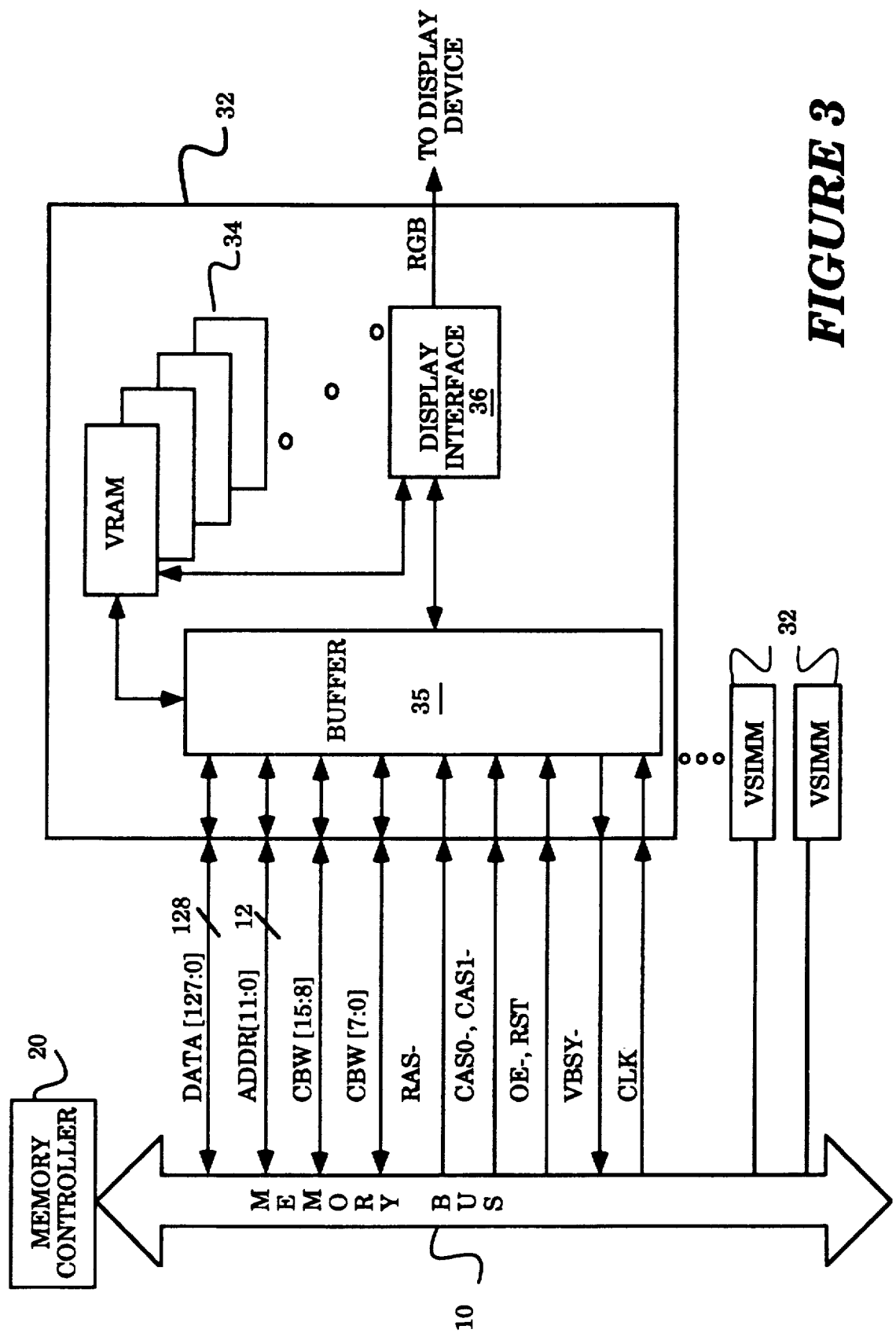
FIG. 3 is a block diagram of a video random access memory (VRAM) single in-line memory module (SIMM) coupled to the memory bus.

Referring now to FIG. 3, a block diagram of a video random access memory (VRAM) SIMM (VSIMM) 32 coupled to the memory bus signal lines 10 is illustrated. In FIG. 3, VSIMM 32 receives address signals (ADDR[11:0]), data signals (DATA[127:0]), together with other shared control signals issued by memory controller 20, through an on-board video buffer 35. Video buffer 35 is in turn coupled to a multiplicity of VRAM chips 34, and to a display interface 36 having an output coupled to a display device (not shown). Multiple VSIMMs 32 may be coupled to memory bus 10, subject to address space constraints discussed in more detail below. Of particular interest in FIG. 3 are the check-bit-write signal lines CBW[7:0] and CBW[15:8], which are commonly distributed across memory bus 10, but which have particular application to VSIMMs 32. In particular, CBW[8] used as an active low byte write enable for VRAMs 34 within VSIMM 32, whereas CBW[7:0] permit loading of a base address into an autoincrement register of a VRAM 34. Use of CBW[7:0] and CBW[15:8] will be illustrated in more detail in connection with FIGS. 9-12. As shown in FIG. 3, the VSIMM 32 contains a video buffer 35 that handles video refresh, and a memory display interface 36 that muxes data from the VRAM into an RGB compatible form. Video buffer 35 can issue a VBSY- signal to command memory controller 20 to release control of the VSIMM 32 whenever VRAMs 34 require refresh or reload cycles. The display interface 36 is contemplated to include a digital-analog-converter on the VSIMM 32, as well as pixel clock generation circuitry.

Figure 4:
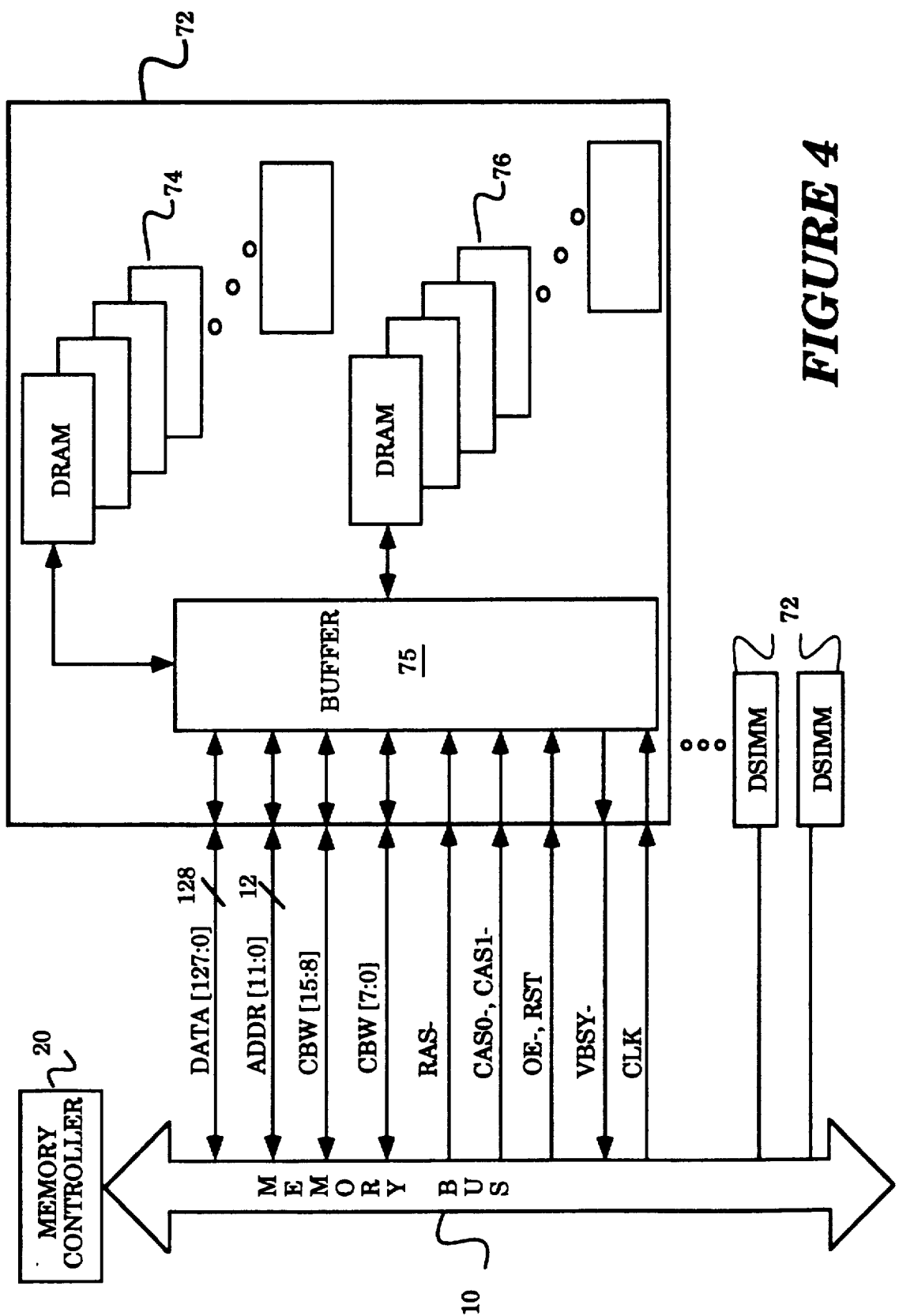
FIG. 4 is a block diagram of a dynamic RAM (DRAM) SIMM coupled to the memory bus.

Similarly, and with reference to FIG. 4, a block diagram of a dynamic random access memory (DRAM) SIMM (DSIMM) 72 coupled to the memory bus signal lines 10 is illustrated. In FIG. 4, DSIMM 72 also receives address signals (ADDR[11:0]), data signals (DATA[127:0]), together with other shared control signals issued by memory controller 20, through an on-board buffer 75. Buffer 75 is in turn coupled to a multiplicity of DRAM chips 74. As in the case of VSIMMs 32 above, multiple DSIMMs 72 may be coupled to memory bus 10, subject to address space constraints discussed in more detail below. In FIG. 3, the check-bit-write signal lines CBW[7:0] and CBW[15:8], which are commonly distributed across memory bus 10 are used as error correction code bits (ECC) with application to DSIMMs 72 in accordance with generally known standards for ECC. VBSY- signal is not used by DRAMs 74, and is not issued by DSIMMs 72.

Figure 5:
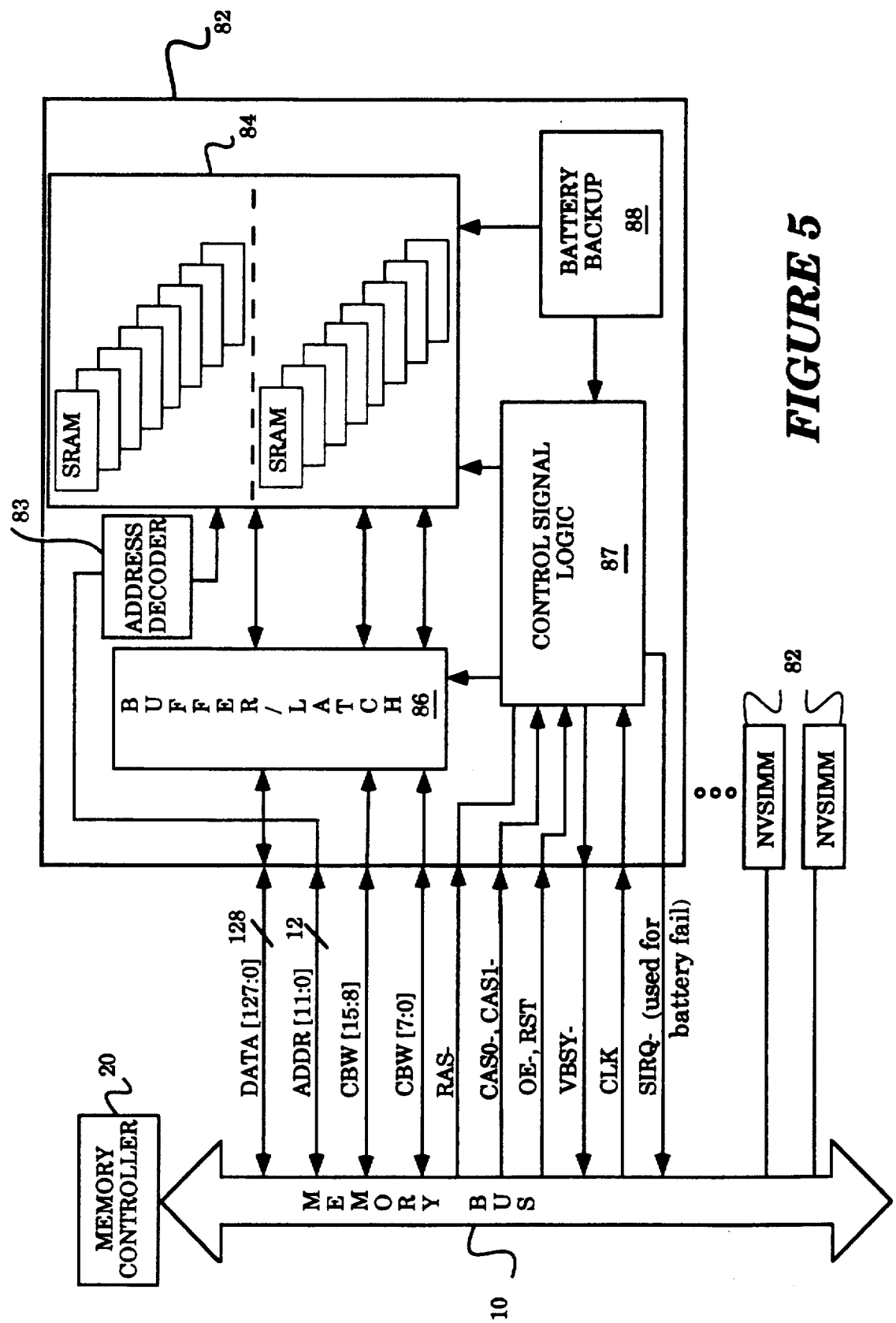
FIG. 5 is a block diagram of a nonvolatile static RAM (SRAM) SIMM coupled to the memory bus.

Referring now to FIG. 5, a block diagram of a nonvolatile static RAM (SRAM) SIMM (NVSIMM) 82 consistent with the protocol of the present invention is coupled to the memory bus signal lines 10. In FIG. 5, NVSIMM 82 receives address signals (ADDR[11:0]), data signals (DATA[127:0]), together with other shared control signals 15 issued by memory controller 20, through an on-board buffer/latch 86. Buffer/latch 86 is in turn coupled to a multiplicity of SRAM chips 84. As in the case of VSIMMs 32 and DSIMMs 72 above, multiple NVSIMMs 82 may be coupled to memory bus 10, subject to address space constraints discussed in more detail below. In the presently preferred embodiment shown in FIG. 5, nonvolatile NVSIMMs 82, are capable of emulating DRAM SIMM operation on the integrated memory bus 10. Therefore, the memory controller 20 communicates with NVSIMM 82 just like another DRAM SIMM 72 installed in as SIMM 30 in FIG. 1. To achieve this result, SRAMs 84 have been installed in place of DRAMs 74 and control signal logic 87 is provided to adjust the timing between NVSIMM 82 to the memory controller 20. Further, a separate address decoder 83 may be necessary to provide proper addressing to SRAMs 84 using the shared multiplexed address lines ADDR[11:0]. Also, the NVSIMM 82 may be supplied with a battery and backup circuit 88 to protect the data stored in NVSIMM 82, in case of power loss.

Referring briefly to FIGS. 21-24, all address, data, and control signals used to implement the memory bus protocol are illustrated. In FIG. 21, particular SIMMs 30 are selected on the basis of two Column Access Strobe (CAS) signals and eight Row Access Strobe (RAS) control signals to all SIMM slots as illustrated. However, the present bus architecture can accommodate up to eight CAS- signals to provide additional selectivity of memory components used within SIMMs 30. In FIGS. 22a and 22b, the high density connector used on each SIMM is illustrated. In contrast to prior art single readout connector designs, the connector used by all SIMMs 30 embraces a double readout design wherein signals are independently routed on each side of the SIMM board. In FIG. 23, a table of the control signals used to implement the protocol for the integrated data and video memory bus. Although all control signals are routed to all SIMM slots location, the video control signals pertain only to VSIMMs 32 and are routed only between video buffer 35 and display interface 36. Finally, FIG. 24 illustrates the pin numbering used in the high density SIMM connector illustrated in FIGS. 22a and 22b, and which is shared by all SIMMs 30 operating on the memory bus 10.

Thus, as presently preferred, and as illustrated in FIGS. 1-5, the memory bus is 128 bits wide for data, and further has 16 error correcting code (ECC) checkbits, yielding a total bus datapath width of 144 bits. In particular, the present embodiment of the memory system uses 80 nanosecond DRAMs 74 and VRAMs 34, thereby providing approximately a 20 MHz data rate for the memory bus. Memory controller 20 is an application specific integrated circuit (ASIC) that in the preferred embodiment interfaces between the 144 bit datapath memory bus (10) and the 64 bit MBus (40). Memory controller 20 services data requests transmitted over bus 40 (MBus) by MBus masters (42) from main memory consisting of one or more DSIMMs 72 (FIG. 4). As presently preferred, memory controller 20 operates it the 40 MHz MBus data rate, and can receive data from any of the SIMMs 30 forming the memory system after RAS- (row access strobe) assertion within 4 clock cycles, or 100 nanoseconds. Actual read access times are 7 clocks, and line read time is at least 10 clocks. Cycle time is at least 11 clocks. Memory controller 20 can generate 128 byte burst transfers with sustained 32 Byte transfers at a rate of 87 megabytes per second. The memory controller-to-MBus read latency from MAS- (MBus address strobe) to first data is 7 MBus clocks. Issuance of RAS- in combination with other control signals to form the operational protocol of the present invention is described in more detail below in connection with FIGS. 6 through 20b.

The maximum amount of main memory is 512 MB, and is determined by there being twenty-nine address bits available in the present implementation of memory controller 20 for addressing memory in a multiplexed column/row manner. The other three bits are used to differentiate I/O spaces in memory space, e.g., between VRAM and DRAM address spaces. Each SIMM 30, and accordingly each SIMM position, has 64 MB of address space allocated to it, i.e., position 0 starts at address 0, position 1 starts address 0×4000000, and position 2 starts at address 1×8000000. Thus, regardless whether there is a 16 MB or a 64 MB SIMM 30 in position 0, the SIMM 30 in position 1 responds to addresses starting at 64 MBytes from 0 or 0×4000000. A boot programmable read-only-memory (PROM) (not shown) determines which SIMM 30 is installed in which position by observing the response from each position while writing and then subsequently reading from appropriate addresses for VSIMMs and DSIMMS.

Because total addressable memory space for the memory bus and associated memory controller is very large (>2 GB), it is possible to have two memory controllers in the present architecture. As presently configured, the first memory controller 20 responds to addresses 0×00000000 to 0×0F000000, whereas the second would respond to addresses 0×10000000 to 0×1F000000. Two memory controllers would allow for two banks of SIMM sockets, therefore increasing a system's memory capacity from eight SIMMs 30 to sixteen. However, in the present implementation of the memory bus architecture, there is only one memory controller 20 on the motherboard, because there physically is only one bundled datapath, namely signal lines 10, from the memory bus 10 to the connector for memory controller 20. It is possible to have another memory controller coupled on the MBus (40), but in that case the second memory controller would have to have its own local memory on its MBus card.

As presently preferred, memory system has eight positions to receive up to eight SIMMs 30, as shown in FIG. 1. SIMM positions 0,2,4, and 6 can contain only DSIMMs 72. The DSIMMs 72 are double sided and may contain 16 megabytes (MB) of DRAM memory using thirty-six 1 megabit-by-4 (1Mb×4) TSOP DRAMs 74. Alternatively, DSIMMs 72 may comprise 64 MB when using thirty-six 4Mb×4 TSOP DRAMS 74. SIMM positions 1,3,5,7 can contain either VSIMMs 32 or DSIMMs 72. The VSIMMs 32 currently are available in two sizes, 4 MB consisting of thirty-two 256K×4 VRAMs 34, and 8 MB consisting of thirty-two 256K×8 VRAMs 34. VSIMMs 32 can also be built with thirty-two 128K×8 VRAMS, thirty-two 256K×8 VRAMS, thirty-two 256K×16 VRAMS, and thirty-two 512K×8 VRAMS.

The presently configured VSIMMs 32 require an extended length video socket in addition to the normal SIMM socket, to route the additional functionality associated with the video output. The present embodiment currently has only two such extended video sockets, in SIMM positions 1 and 3. Thus, although the memory bus architecture supports multiple frame buffers (VSIMMs 32) residing on the memory bus, physical space limitations within the present implementation limits the number of VSIMMs 32 as frame buffers to only two, in the absence of extra flex-cabling to route the video signals to the back panel, from positions 5 and 7. However, it is possible to have more than two frame buffers in the present implementation, where the additional VSIMMs 32 reside on the MBus 40, or on the SBus 50. Thus, the memory bus architecture can presently support a maximum of 512 MB of DRAM when using 64 MB DSIMMs 72. Specific DSIMMs 72 supported by the memory controller 20 are enumerated below. Similarly, specific VSIMMs 32 supported by the memory controller 20 are also enumerated below.

Because the memory controller 20 in the preferred embodiment of the present invention incorporates non-continuous memory addressing, software can use a mirroring scheme to identify the memory configuration at boot time. Unidentified address space accesses will cause an MBus time-out in accordance with the MBus protocol. As stated above, the memory controller 20 supports a variety of SIMMs 30, including DRAM, VRAM, and SRAM modules, and memory controller 20 can directly support up to four VSIMMs 32 in four slots. Given the many SIMM slot/board combinations (forty-eight in the presently preferred embodiment), identification of any SIMM 30 installed in any position is accomplished through software. Configurations for slot-specific SIMMs 30, for example VSIMM 32, can be set prior to standard SIMM accesses. As presently preferred, the SIMM position probe determined configurations can also be used for system memory mapping.

The MBus slave interface 20a shown in FIG. 2 which implements the full level-2 MBus slave protocol as described in the SPARC MBus Interface Specification, revision 1.1, is subject to the following clarifications. All eight MBus transaction sizes are supported. All MBus defined transaction types are supported. The MBus-acknowledges issued by memory controller 20 are presently limited to those without MRTY- (MBus retry), because retries are not generated or serviced by the memory controller 20. However, other implementations of memory controllers may include MRTY-. During coherent transfers, reflective updates are not supported. CI operations can be disabled to allow other devices to own the MBus CI acknowledge. An asserted MIH, in the MIHDEL window, aborts the coherent MBus transfer acknowledge and relinquishes bus ownership.

C. MEMORY SYSTEM—Memory Controller Transaction Semantics

1. DRAM Control

The operations cycle timing relationships are shown in the timing diagrams illustrated in FIGS. 6-20. CAS- is used to select a double word from the quad word data bus. Each SIMM 30 is selected by one of eight RAS- signals (one RAS- per 128 bits). The twelve bit address can support up to 16 Mb asymmetric DRAM components in column/row address form. Partial double word accesses are accomplished with an internal read modify write cycle. Coherent transfers extend their response window by the programmed MIHDEL. Wrapped read burst transfers supply the first double word on the transfer's eight byte aligned address. Stores use the DRAM early write cycle transfer.

2. VRAM Control

Figure 8:
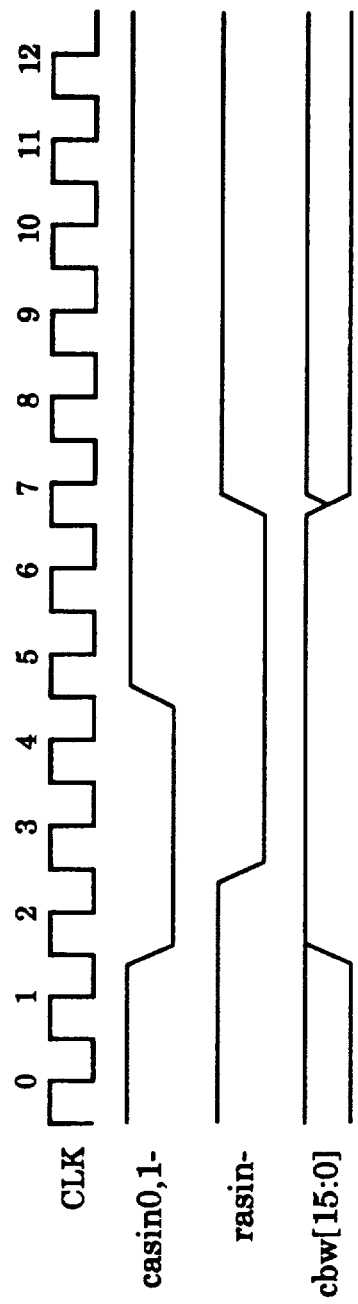
FIG. 8 is a timing diagram illustrating a CAS before RAS refresh cycle, according to the protocol of the present invention.

No error correction code (ECC) check bits or parity are used for VRAM transfers. Therefore, the byte write enables (WE-) are multiplexed on the checkbit-bit-write (CBW) signal lines bus to save pins. The parallel port of each VRAM 34 is accessed with the same timing constraints as DRAMs 74. As shown in FIG. 8, the CBWs [15:0] are deasserted during refresh cycles. Each VRAM 34 may be accessed via a serial port over a 128 bit data path for both two and four MB frame buffers by asserting an SIRQ- signal, or over a 256 bit data path for the eight and sixteen MB frame buffers. The 256 bit data path width would be used to support double buffered true color for high resolution monitors. The current implementation requires a 619 ohm pull-up on MRDY- for VRAM read operations.

3. VSIMM Preemptive Protocol—Overview

As previously shown in FIG. 3, VRAM 34 is located on a VSIMM 32, and is serviced by the video buffer 35 on VSIMM 32. In efficient modular fashion, the video buffer 35 is responsible for performing VRAM refresh and reload cycles. Memory controller 20 VSIMM requests are arbitrated with the video buffer 35 using the preemptive protocol consistent among all SIMMs 30. The requesting video buffer 35 will synchronously assert VBSY- no sooner than the second rising edge after the memory controller 20 RAS- is asserted. The memory controller 20 then non-destructively preempts any in-progress memory controller 20 transfer cycle as the video buffer 35 transitions out of its idle window. The memory controller 20 relinquishes VSIMM ownership to the video buffer 35 by deasserting RAS- for two consecutive clocks. Once the video buffer 35 acquires VSIMM ownership, it blocks all VRAM controls shared with memory controller 20 and logically overdrives them (adhering to the VRAM access protocol). The video buffer 35 also then deasserts the tri-state enable for the separate memory controller 20 CBW buffer.

The maximum period from the end of the idle window to a completed service is called the ACTIVE window. The VSIMM 32 synchronously responds with VBSY- to an initial memory controller 20 RAS-slot request while the video buffer 35 is actively servicing. VBSY- remains asserted (active low) until the VSIMM servicing is completed and the video buffer 35 is no longer in an ACTIVE window or blocking shared signals, thus ensuring a memory controller 20 transfer does not get unknowingly blocked. After retaining VSIMM ownership, the memory controller 20 restarts the interrupted transfer. The present protocol permits memory controller 20 to monitor VBSY- as it transitions out of its interrupted transfer state and reasserts RAS- to determine whether, during a memory controller 20 refresh to a different SIMM position, the video buffer 35 assumed VSIMM ownership. Periodic VSIMM refresh and shift reload service, by the video buffer 35, is scheduled to occur after the minimum programmable delay of twelve pending cycles. The active window for video buffer 35 can be extended from a minimum of twelve clocks to accommodate the system configuration (e.g. the active window size should be programmed larger than the minimum coherent delay). Further details of this protocol should be referenced from the VSIMM protocol spec.

4. Protocol/Interface signals

The control signals used by the ECC memory controller 20 and all SIMMs 30 to implement the memory bus protocol are:

| | |
|---|---|
| D[127:0] | Bi-directional multiplexed data bus signal lines. |
| CBW[15:0] | Byte write enables. During write accesses to VRAMs 34 these lines specify the bytes to be written and are driven high for VRAM reads. For register I/O accesses CBW[7:0] are used as a bi-directional data bus and CBW[8] is used as the read/write-signal. All register cycles are byte transfers. |
| IOSEL- | VRAM 34 or register access select. When asserted this signal selects the register I/O space. Otherwise the access is to VRAM 34. This signal is used to qualify RAS- (see FIGS. 9-16). |
| VBSY- | Video busy used to implement the preemptive protocol. When asserted in response to a RAS-, the video buffer 35 is either busy with a reload or refresh cycle, or seeks to perform such a cycle. (see FIGS. 13-20b). |
| RAS- | Row address strobe for accesses to VRAMs 34, when IOSEL- is negated (high). With IOSEL- asserted low, RAS- is used as a chip select for register I/O transfers (see FIGS. 13-20b). |

| IOSEL- | RAS- | Function |
|---|---|---|
| 0 | 0 | Register I/O chip-select |
| 1 | 0 | VRAM access, RAS- asserted |
| 0 | 1 | VSIMM busy, no RAS- or chip-select. |
| 1 | 1 | VSIMM idle |

| | |
|---|---|
| CASIN0 | VRAM Column address strobe long word 0. |
| CASIN1- | VRAM Column address strobe long word 1. |
| A[11:0] | Multiplexed row/column address bus for VRAM accesses. |
| A[8:7] | Used as cycle type specifier for Register I/O cycles as follows: |

| A[8] | A[7] | Cycle |
|---|---|---|
| 0 | 0 | AH. CBW[7:0] is used to transfer IOA[15:8] |
| 0 | 1 | AL. CBW[7:0] is used to transfer IOA[7:0] |
| 1 | 0 | Direct mode Data on CBW[7:0]. |
| 1 | 1 | Auto-increment mode DATA ON CBW[7:0]. |

| | |
|---|---|
| MCLK | MBus system clock. All transfers are synchronized to this clock. |
| ROE- | VRAM output enable. This signal is used to enable VRAM read data on the D[127:0] lines. It is not used for register I/O cycles. |

All VRAM transfers from the memory controller 20 are initiated by the assertion of RAS- with IOSEL- negated (high).

Figure 6:
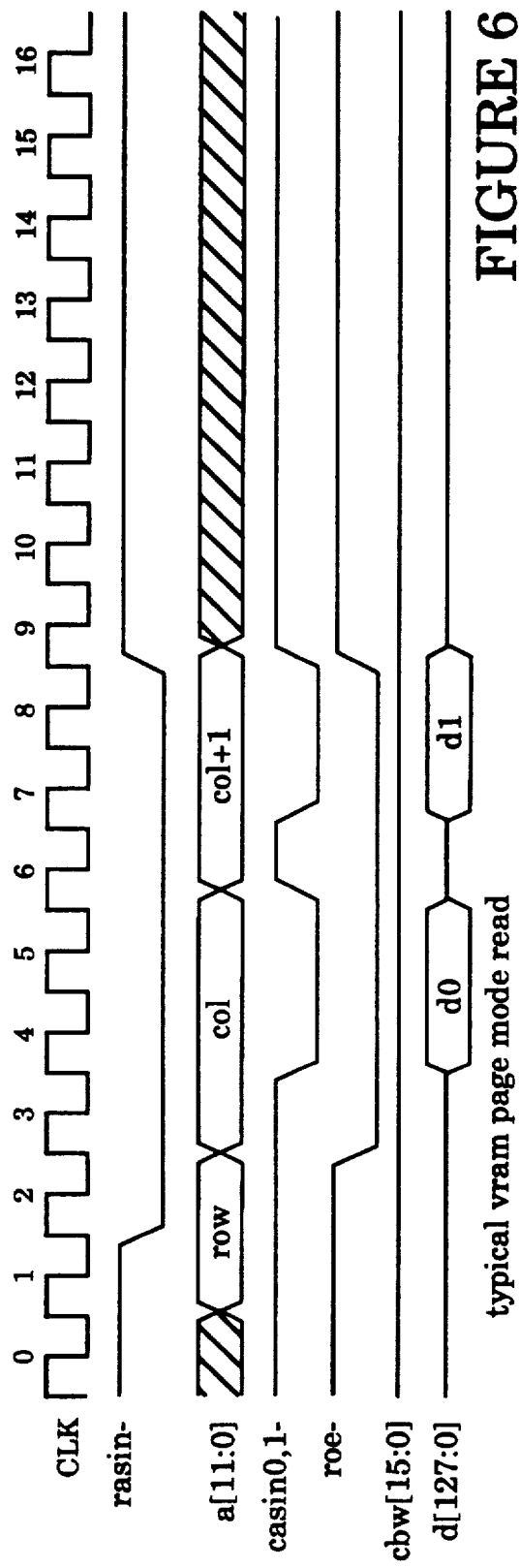
FIG. 6 is a timing diagram illustrating a VRAM page mode read, according to the protocol of the present invention.

5. VSIMM Preemptive Protocol for VRAM I/O (IOSEL- negated) —Read Transaction Semantics Reference is now made to FIG. 6, which illustrates the timing during a VRAM page mode read, according to the protocol of the present invention. In FIG. 6, a memory read operation begins with an MBus data request from an MBus address, which is performed by asserting MAS- active low together with the address from which data is requested from being driven on the MBus address lines MAD [63:0]. If the memory controller 20 finds this data within its memory space, it puts the associated Row Address (RowAd) onto the memory bus address lines ADDR[11:0], and then asserts RAS- to active low. Then, the memory controller 20 puts the associated Column Address (ColAd) on the memory bus address lines ADDR[11:0] while asserting CAS-. After the assertion of CAS-, the first data returns on the memory bus data lines DATA[127:0]. Using presently preferred VRAMs 34, data is returned approximately 100 nanoseconds after the initial assertion of RAS-. The data is buffered through the memory controller 20 in one cycle and sent out onto the multiplexed data/address lines (MAD [63:0]) of MBus (40). Finally, an acknowledgment MRDY- signal (not shown) is asserted while the data is returned on the MBus 40 to acknowledge that the data transfer was successfully completed.

Figure 7:
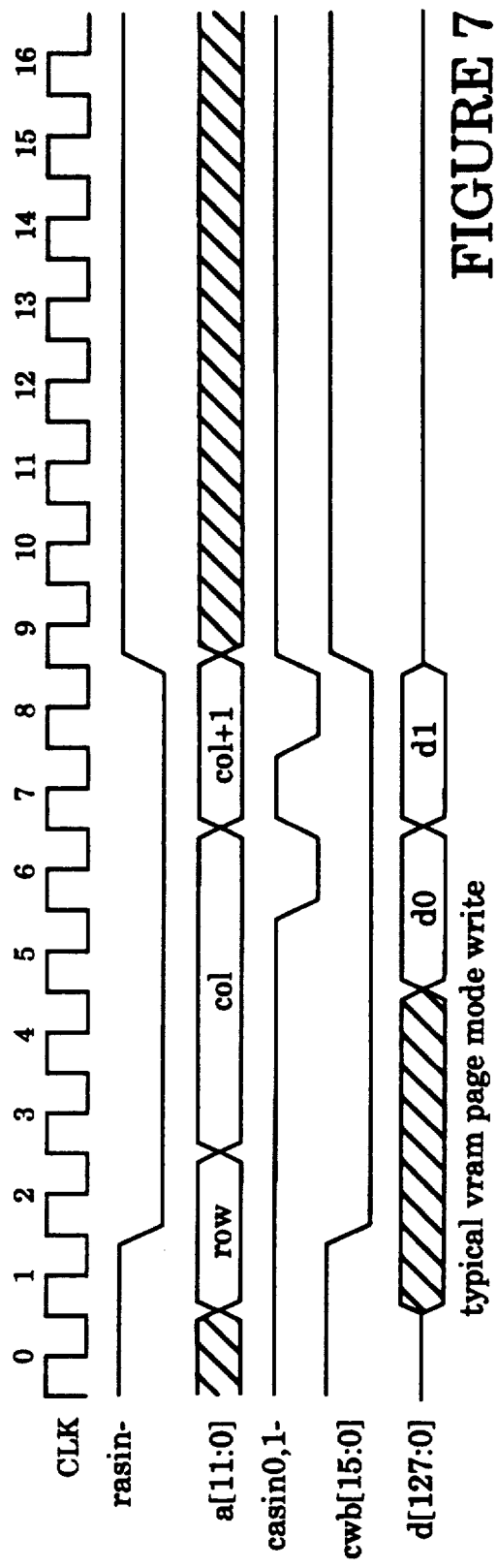
FIG. 7 is a timing diagram illustrating a VRAM page mode write, according to the protocol of the present invention.

5. VSIMM Preemptive Protocol for VRAM I/O (IOSEL- negated) —Write Transaction Semantics Reference is now made to FIG. 7, which illustrates the timing during a VRAM page mode write, according to the protocol of the present invention. In FIG. 7, a memory write transaction begins with a MBus write request consisting of a main memory address asserted on the MBus address lines MAD [63:0], along with MAS-. In the next clock cycle, the data to be written is asserted on the MBus address lines MAD [64], the first four bytes being asserted on the MAD lines for two cycles, and then each consecutive four bytes being asserted on the MAD lines for one cycle. During the four cycles that each four bytes is asserted on the MBus address lines, an MRDY- signal (not shown) is asserted to acknowledge that this is a Valid Data Transfer. Once MRDY- is asserted, memory controller 20 asserts RAS-, along with the specified Row Address (RowAd). On the fifth cycle, the data is asserted on the memory bus 10, along with write enable (WE-), which remains asserted for the next three cycles. On the third cycle, memory controller 20 asserts Column Address (ColAd0), and three cycles later, CAS- is asserted at cycle 6, in which the first 144 bits of data are written. A new Column Address (ColAd1) is asserted in clock cycles 7 and 8, for which the data (that was asserted on cycles 7 and 8) is written when CAS- is asserted in clock cycle 8.

5. VSIMM Preemptive Protocol for VRAM I/O (IOSEL- negated) —Refresh

With reference to FIG. 8, the protocol supports the CAS- before RAS- refresh cycle. However the video buffer 35 may ignore this cycle if it is programmed to perform refresh cycles for VRAMs 34.

6. VSIMM Preemptive Protocol for Register I/O (IOSEL- asserted)

All register I/O cycles are initiated by the assertion of IOSEL- followed by RAS-. RAS- in this case is used as a chip select for reading and writing the device registers. There are two types of register cycles, 1) direct mode accesses consisting first of an address transfer followed by one or more data byte transfers and 2) indirect mode accesses whereby there is no address transfer. The responding device automatically increments an address in its preloaded auto increment address register at the end of each data byte transfer.

Indirect mode accesses are always done to I/O address (IOA) page 15. The memory controller 20 encodes auto increment mode data on A[8:7]. The addressed device is decoded from the previously loaded auto increment address register discussed below.

Figure 9:
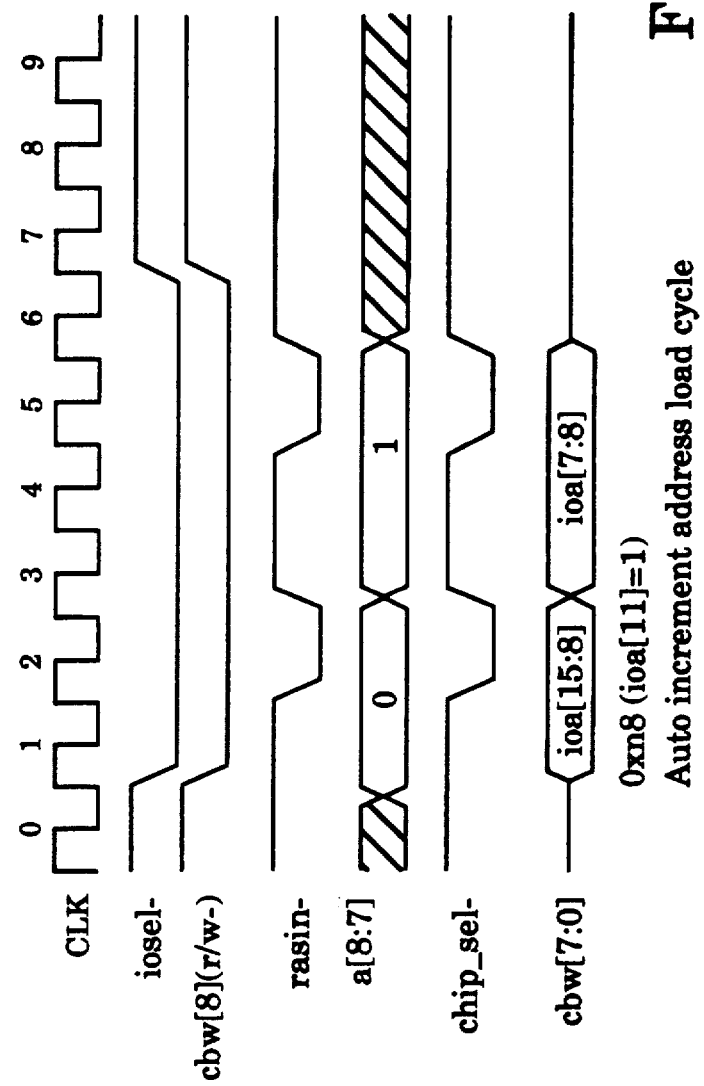
FIG. 9 is a timing diagram illustrating loading of an address into VRAM supporting autoincrement read/write, according to the protocol of the present invention.

Referring now to FIG. 9, an illustration of loading an address in an auto increment address register is shown. This cycle type is used to load an auto increment address register in the responding device. It is loaded from the CBW[7:0] lines during two successive data byte transfers of the address to be loaded. Any write to IOA 0×8nn (bit 11 set) will cause the address on the CBW[7:0] lines during the address transfer to be loaded in the auto increment address register. The data transfer is suppressed in this cycle type.

Referring now to FIGS. 10a and 10b, an illustration of direct mode read and write operations are shown, respectively. Direct mode register cycles are used primarily to setup device registers. The present protocol supports byte, half-word, word and double word transfer sizes. An address high (AH) and address low (AL) address transfer cycle is followed by one or more data byte cycles as determined by the transfer size. The responding device increments the address in its address register at the end of each data byte transfer.

Referring now to FIGS. 11a and 11b, an illustration of indirect mode read and write operations supported by the present protocol are respectively shown. Indirect mode accesses uses the auto increment address register for decoding the addressed device. This addressing mode is used primarily to initialize look up tables stored in VRAMs 34. This register would have been previously loaded with a device address as described in connection with FIG. 9 above. The memory controller 20 then performs page 15 read or write accesses to IOA[15:0]. The auto increment address register is incremented after each data byte transfer.

Figure 12:
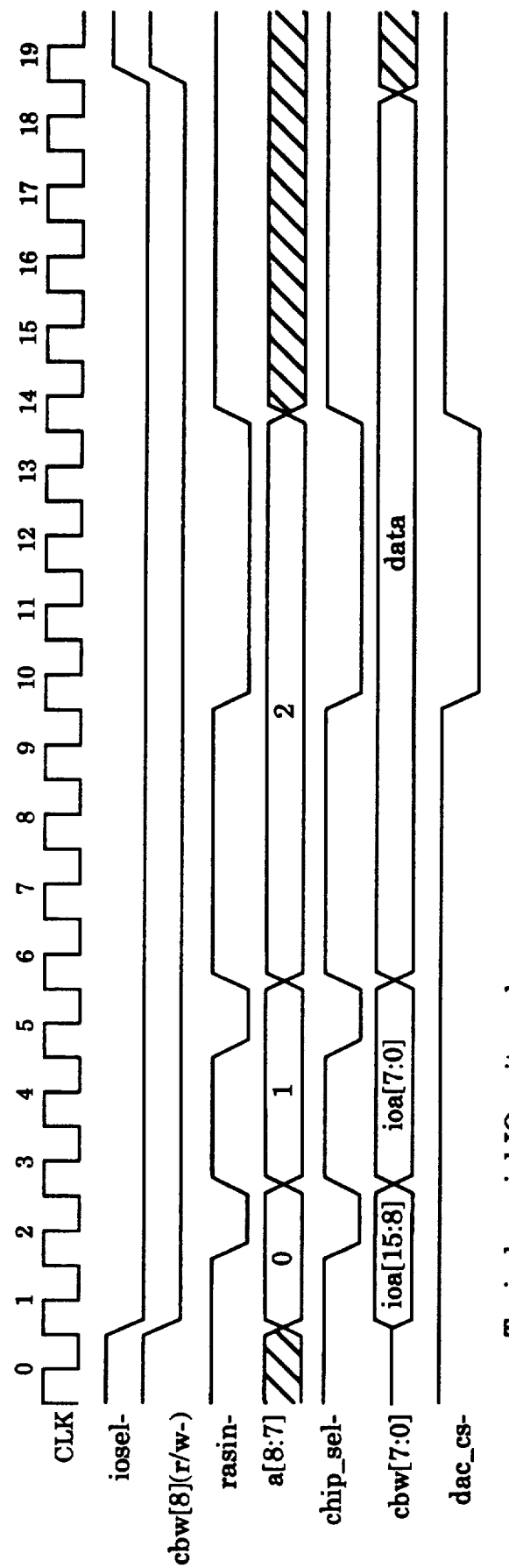
FIG. 12 is a timing diagram illustrating a write cycle to I/O space for special I/O operations, according to the protocol of the present invention.

Referring now to FIG. 12, an illustration of a special I/O cycle access is shown. Special I/O cycles are used to access and initialize devices with long chip select access times, or those requiring excessive data setup and hold times. The memory controller 20 and present protocol supports special cycles for accessing, for example, the digital-to-analog converter or equivalent devices contained in VSIMM 32.

7. Preemptive Protocol

The VBSY- signal is asserted by the video buffer 35 to preempt a memory controller 20 access cycle in progress to any VRAM 34 if video buffer 35 needs to perform a video reload or refresh operation. VBSY- is also asserted in response to detecting a RAS- while a reload or refresh operation is already in progress. The memory controller 20 in these cases would deassert RAS- and wait for the negation of VBSY- (transition to high) before retrying its cycle.

The video buffer 35 asserts VBSY- based on the assertion of RAS- and whether or not video buffer 35 is currently active or must perform an access cycle to VRAMs 34. The video buffer 35 negates VBSY- when video buffer 35 has completed its access to the VRAMs 34. This must be done such that RAS- precharge is maintained at the VRAMs 34. The present protocol supports video buffer 35's implementation of REQUEST and ACTIVE windows. The REQUEST window is an service request generated internally by video buffer 35, whereas the ACTIVE window represents the state where the memory controller 20 is blocked from accessing the VRAMs 34. The decision to enter the ACTIVE or blocking window for the REQUEST state is based on whether the current memory controller 35 cycle is to VRAMs 34 memory space or to register I/O space. The ACTIVE state is entered one clock cycle after the latest negation of RAS- or IOSEL-. Thus the active state is controlled by RAS- for access cycles to memory space and IOSEL- for VRAM register I/O cycles.

7.1. VBSY Assertion and negation rules

Figure 13:
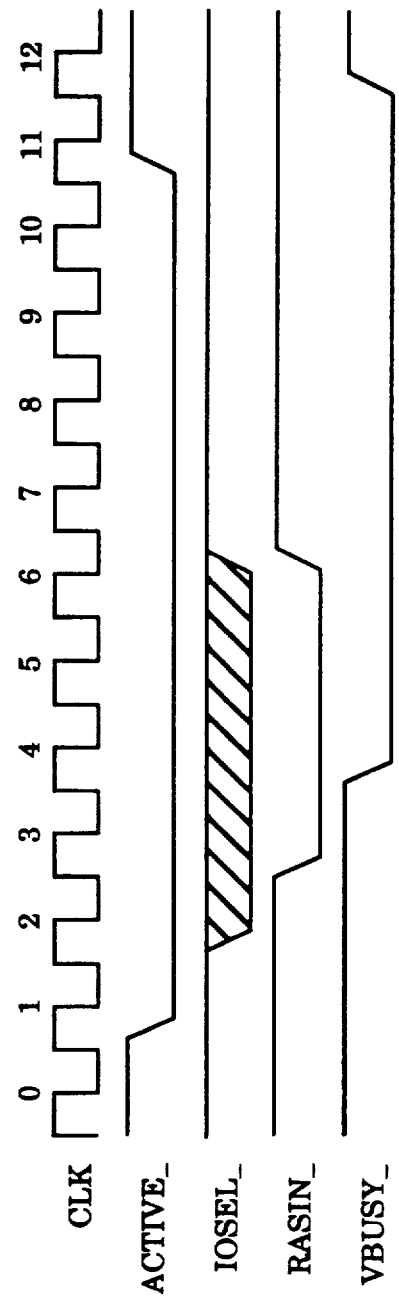
FIG. 13 is a timing diagram illustrating an assertion of an internal control signal within a video buffer to block RAS issued by the memory controller when VRAM is being refreshed/reloaded, according to the protocol of the present invention.

Referring now to FIG. 13, an illustration of assertion of VBSY- is shown, wherein video buffer 35 is in ACTIVE state and RAS- is detected as issued by memory controller 20. Generally, the video buffer 35 asserts the VBSY- signal one clock cycle after the RAS- input is asserted if the video buffer 35 is performing or must soon perform a memory cycle. In FIG. 13, the video buffer 35 asserts VBSY- one clock cycle after detecting a RAS- if within its ACTIVE window. VBSY- is negated (transitions high) two cycles after it negates RAS- to the VRAMs 34. The memory controller 20 may reassert RAS- two clock cycles after it negates RAS to the VRAMs 34. The memory controller 20 may reassert RAS- two clock cycles after detecting VBSY- negated. RAS- precharge timing is thereby maintained at the VRAMs 34.

Figure 14:
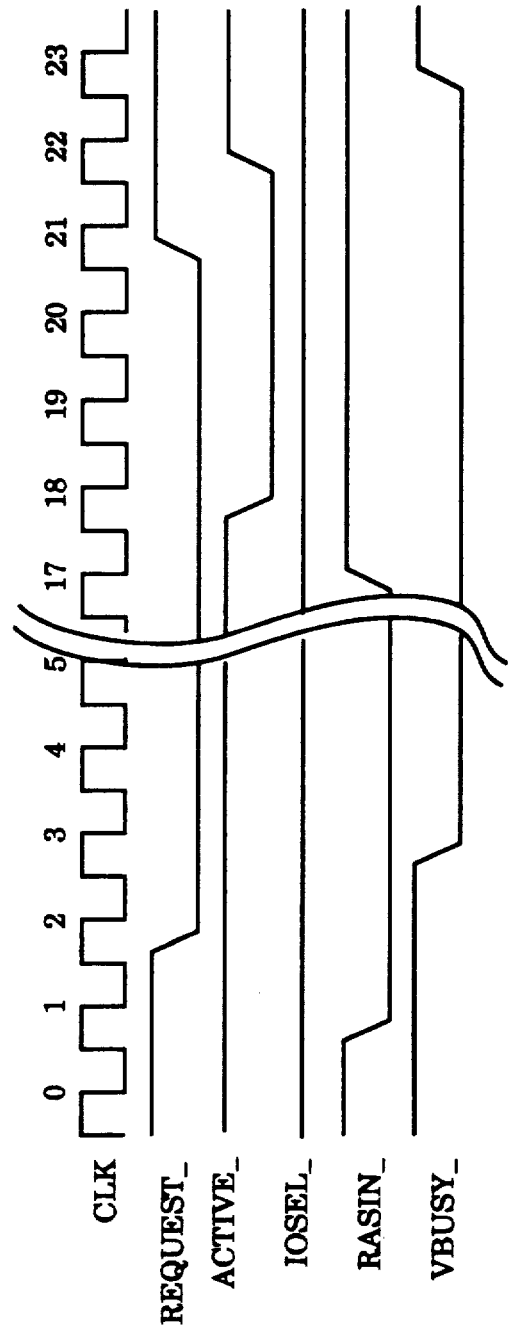
FIG. 14 is a timing diagram illustrating an assertion of an internal control signal within the video buffer to terminate a memory access by the memory controller when VRAM requests service, according to the protocol of the present invention.

Referring now to FIG. 14, an illustration of assertion of VBSY- is shown, wherein a VRAM access cycle by memory controller 20 is already in progress, and where video buffer 35 must perform a refresh or reload cycle (i.e., video buffer 35 enters REQUEST state). Generally, if a memory controller 20 memory cycle is already in progress, and the video buffer 35 needs to perform a VRAM operation, VBSY- interrupts the memory controller 20. The memory controller 20 will end its access within a predefined number of clock cycles. One clock cycle after RAS- is deasserted, the video buffer 35 will perform its memory cycle. VBSY- in this case is used to preempt the memory controller 20's access cycle to VRAM 34 already in progress. The memory controller 20 will terminate its cycle within a predefined number of clock cycles. According to the implementation of the present memory controller 20, this limit is currently set at thirteen cycles. One clock cycle after RAS- is deasserted the video buffer 35 may enter its ACTIVE state. The video buffer 35 is responsible for meeting the RAS-precharge specification for VRAMs 34. Thus the assertion of its RAS- will not occur before four cycles after the negation of RAS-.

Figure 15:
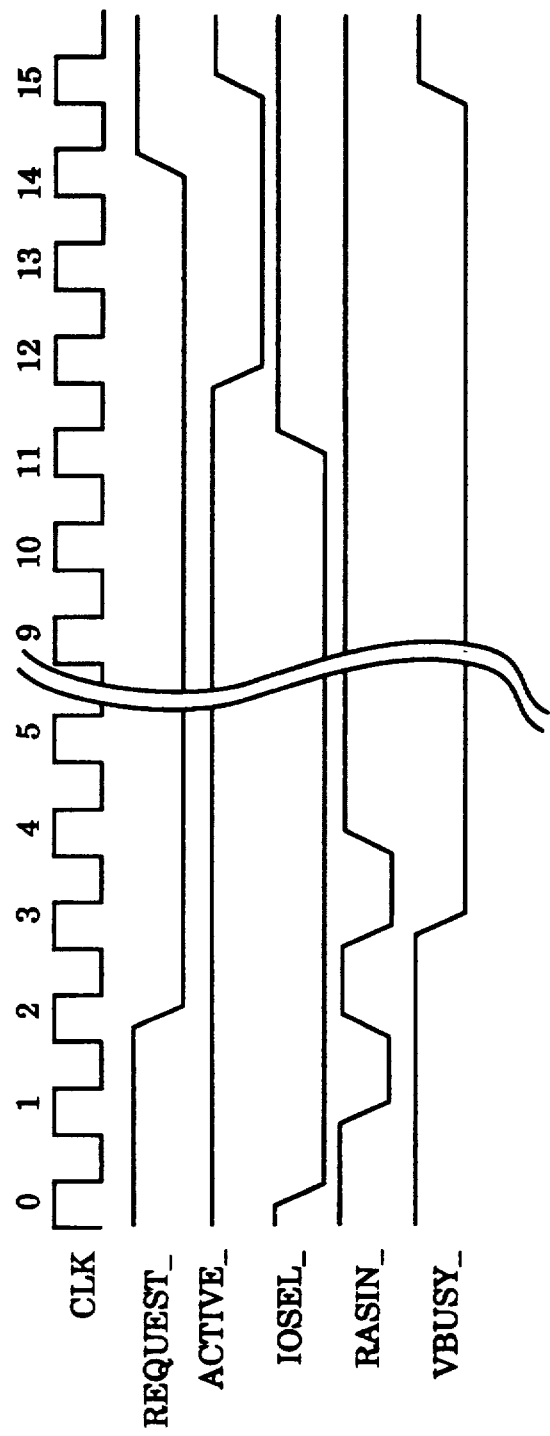
FIG. 15 is a timing diagram illustrating an assertion of internal control signals within the video buffer to terminate an I/O access by the memory controller when VRAM requests service, but where the memory controller is permit to complete its access.

Referring now to FIG. 15, an illustration of assertion of VBSY- is shown, wherein there is already in progress a register I/O cycle by memory controller 20, and wherein video buffer 35 enters its REQUEST state. If an memory controller 20 register cycle is in progress when the video buffer 35 needs to perform a VRAM operation, VBSY- interrupts the memory controller 20. This case is similar to the previous case except that the ACTIVE- assertion is delayed until the deassertion of IOSEL-. In this case, VBSY- is also used to preempt the memory controller 20's register I/O cycle in progress. The memory controller 20 will terminate its cycle within a predefined number of clock cycles, and is currently set at thirteen cycles. Once clock cycle after IOSEL- is deasserted, the video buffer 35 may enter its ACTIVE state.

Figure 16:
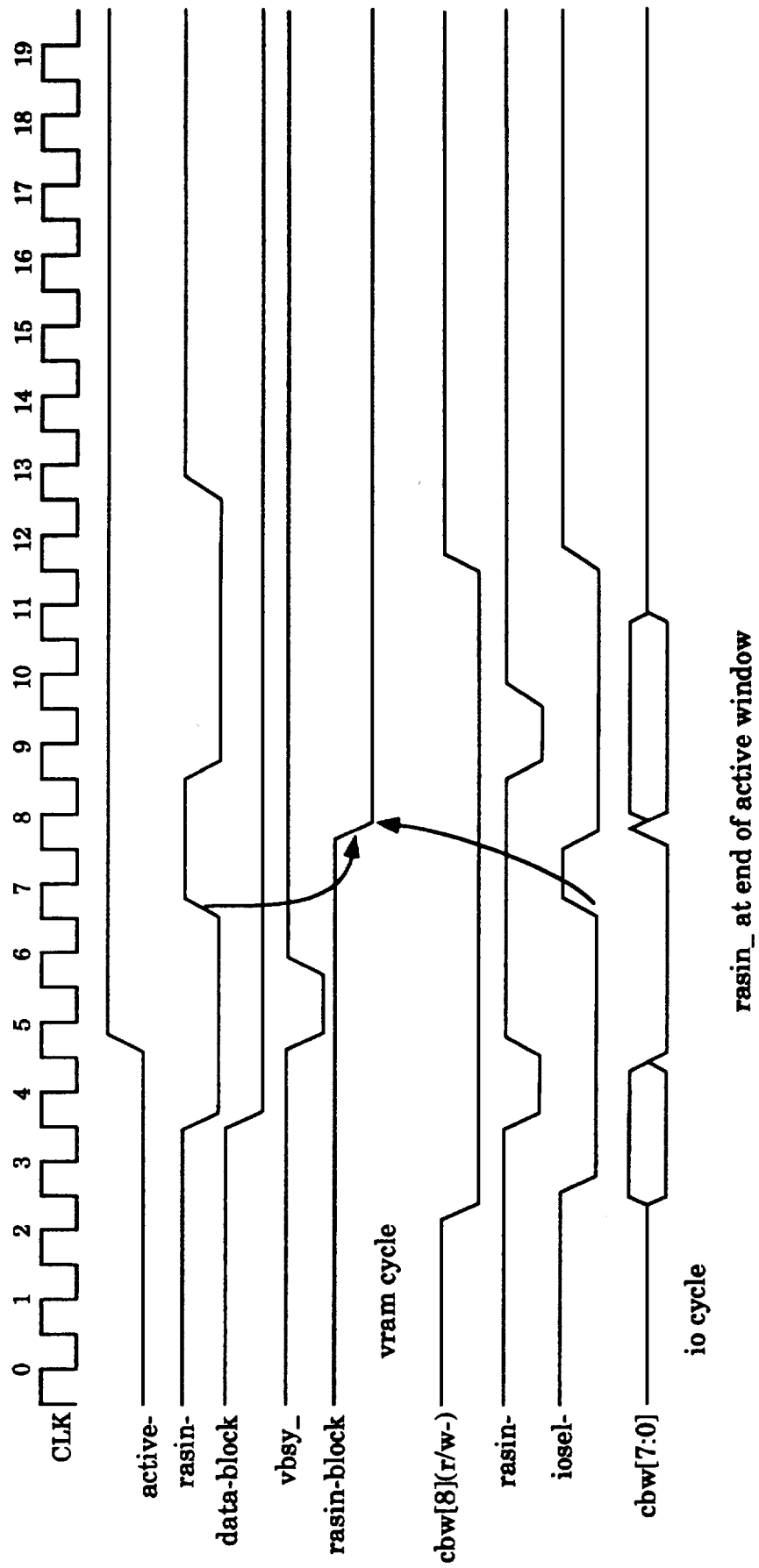
FIG. 16 is a timing diagram illustrating an assertion of a data block control signal within the video buffer to block generation of internal control signals.

Referring now to FIG. 16, an illustration of special protocols available on the integrated memory bus to guarantee reliable glitch-free operation of RAS- and chip select during the transition of ownership between the memory controller 20 and video buffer 35. In each case, VBSY- asserted for one clock at the end of its ACTIVE window due to maintain consistency with the protocol illustrated in FIG. 13 above. In FIG. 16, the VBSY- decision window must extend one cycle beyond the ACTIVE window because the memory controller 20 was blocked from the video buffer 35. If VBSY- were not asserted, the memory controller 20 would complete its access when in fact the data or address cycle was blocked for register I/O access or VRAM access, respectively.

Still referring to FIG. 16, the present protocol supports a data_block signal generated by the video buffer 35 to block the address and data lines. A rasin_block signal is internally generated to block issuance of other internal control and blocking signals: RAS-, CAS- and chip_select. Rasin_block would be negated at the end of MCLK 4 if RAS- is not asserted. Otherwise rasin_block remains asserted until the latter of RAS- or IO-SEL- negated.

7.2. Special Protocols to support Video Buffer Functions

Figure 17:
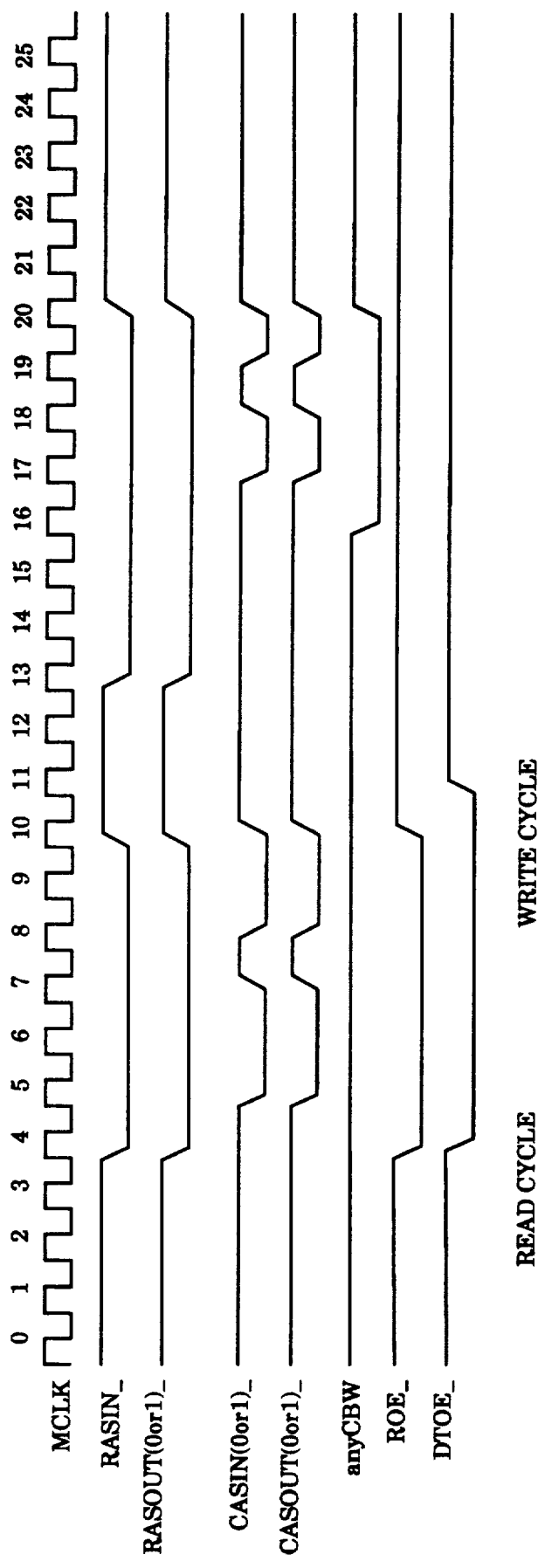
FIG. 17 is a timing diagram illustrating buffering by the video buffer of CAS, RAS, and check-bit-write bits (CBWS) issued by the memory controller.

The video buffer 35 allows a single memory system to have multiple VSIMMs 32 with independent video timing. Each VSIMM 32 contains the components needed to allow a video monitor to be connected to the system. All of the VSIMMs 32 in the system are controlled by the memory controller 20 on the motherboard. With reference to FIG. 17, the video buffer 35 generally acts as a simple buffer for the multiplexed address lines ADDR(11:0], the byte write enables CBW[15:0], and the RAS- and CAS- lines which are generated by the memory controller 20. The video buffer 35 asserts DTOE- when the memory controller 20 asserts ROE-, enabling the outputs of the VRAMs 34 for read cycles. Occasionally, the video buffer 35 must take control of the outputs to the VRAMs in order to perform refresh and reload cycles. As shown in FIG. 17, when the refresh and reload cycles are in progress or are imminently required, and RAS- is asserted by the memory controller 20, the video buffer 35 asserts the VBSY- signal to memory controller 20 to signal that the VRAMs 34 cannot be accessed. The video buffer 35 is also used to control register operations for its own internal registers and the registers of the other components on the VSIMM 32. The register operations are described in another portion of this document.

The protocol of the present invention further supports resolution of control of VRAMs 34 when refresh and reload operations must be performed. The video buffer 35 refreshes VRAMs 34 at a rate determined by the bits in an internal control register. The video buffer 35 counts clock cycles and asserts an internal refresh request at the appropriate time. If refresh enable is set, refresh attempts by the memory controller 20 are blocked. If the refresh enable is cleared and the memory controller 20 is programmed to perform refresh to the VSIMM 32, proper operation will result.

Figure 18:
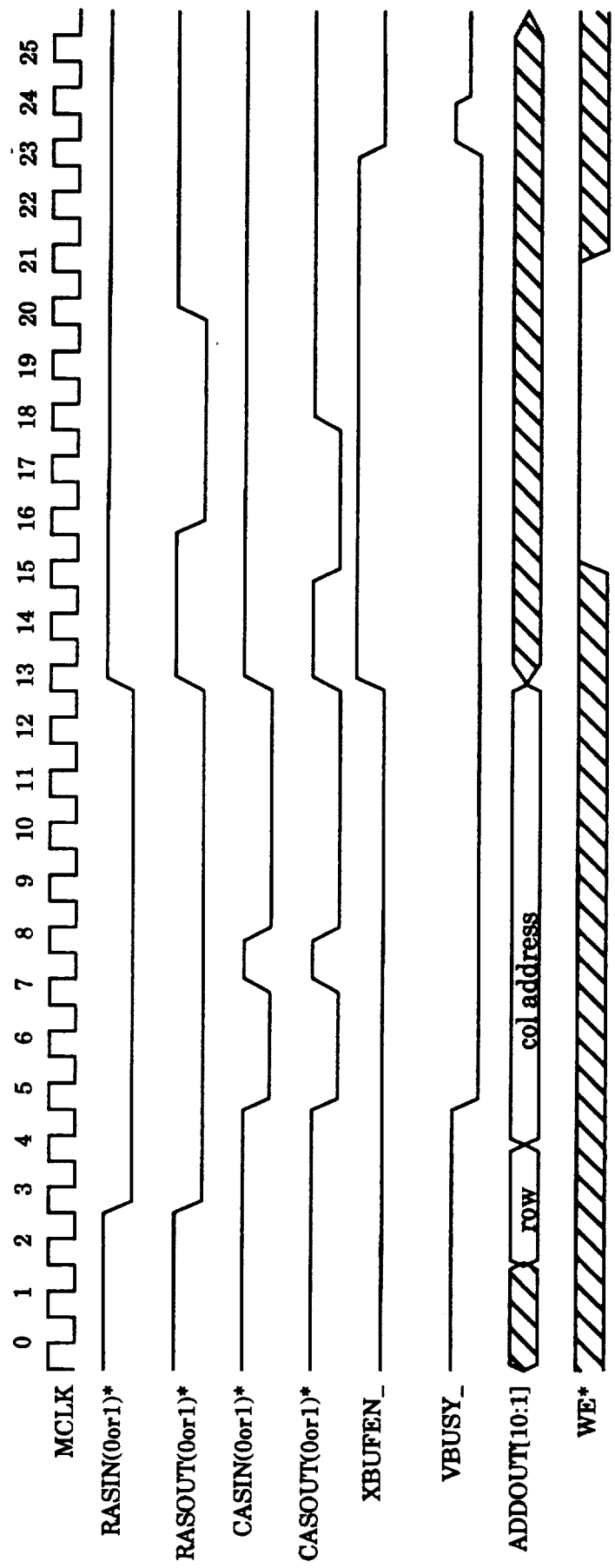
FIG. 18 is a timing diagram illustrating the function of the video buffer during VRAM, refresh, according to the protocol of the present invention.

Referring now to FIG. 18, an illustration of the operative protocol when the video buffer 35 is performing a refresh cycle and the memory controller 20 asserts RAS-, the video buffer 35 asserts the VBSY- signal. The memory controller 20 will then deassert the RAS- and will wait until VBSY- is deasserted before trying again. If the video buffer 35 needs to perform a refresh cycle when the memory controller 20 is already performing a memory or register I/O cycle, VBSY- will be asserted and held. The memory controller 20 will preempt its memory cycle with-in nine clock cycles. When the memory controller 20 deasserts RAS-, the video buffer 35 will perform the refresh cycle. VBSY- is deasserted when the refresh operation is completed. Note that if RAS- is not asserted, VBSY- will remain tristated throughout the refresh cycle.

Figure 19:
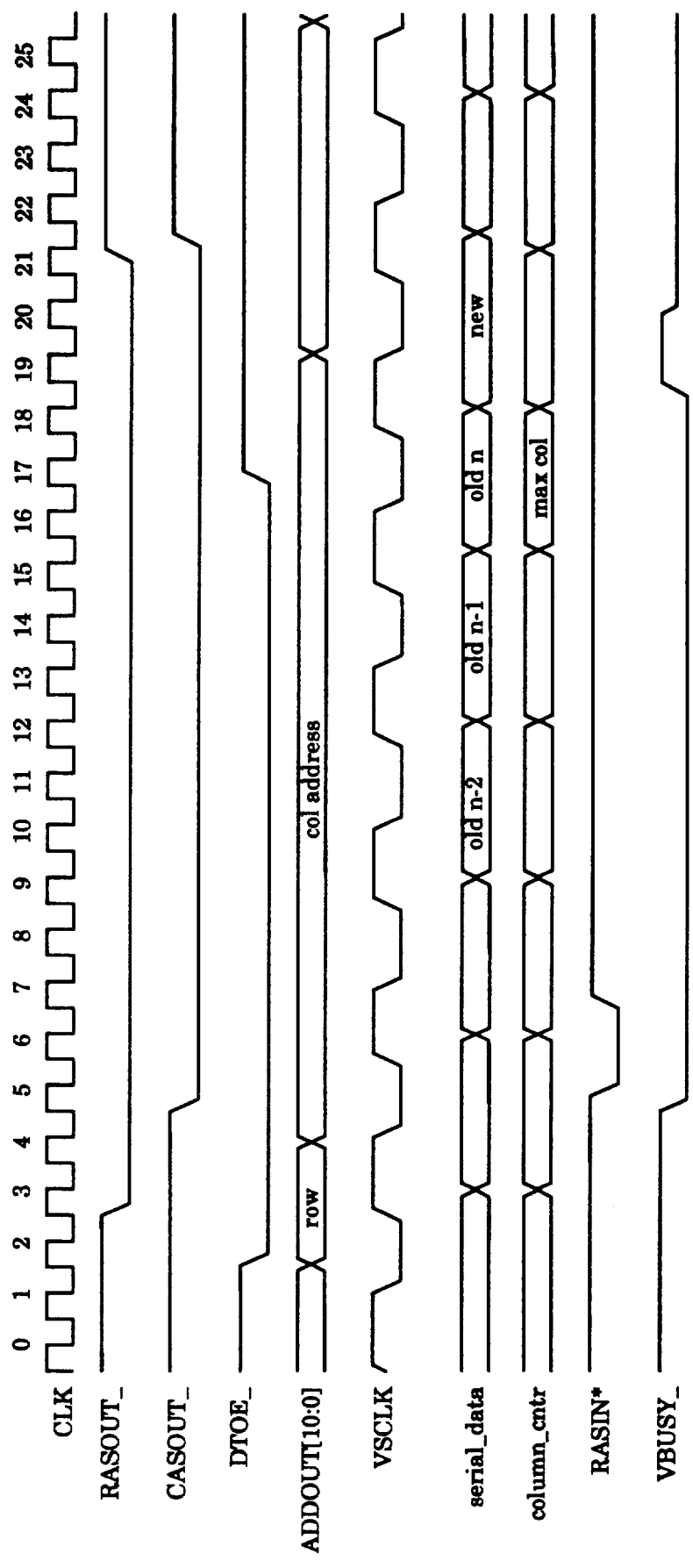
FIG. 19 is a timing diagram illustrating the function of the video buffer during VRAM reload, according to the protocol of the present invention.

Referring now to FIG. 19, the protocol supports video buffer 35 reload cycles to VRAMs 34 as needed to keep the VRAM shift registers loaded properly. When the video buffer 35 is performing a reload cycle and the memory controller 20 asserts RAS-, the video buffer 35 asserts the VBSY- pin. The memory controller 20 will then deassert the RAS- and will wait until the VBSY- is deasserted before trying again. If the video buffer 35 needs to perform a reload cycle when the memory controller 20 is already performing a memory cycle, VBSY- will be asserted and held. The memory controller 20 will preempt its memory cycle within eleven clock cycles. When the memory controller 20 deasserts the RAS-, the video buffer 35 will perform the reload cycle. VBSY- is deasserted when the reload operation is completed.

D. Memory System Architecture and Implementation

1. DSIMM

As previously stated, the present memory bus architecture has a 128 bit datapath width, together with 16 bits of ECC (Error Correcting Code). The memory bus can have two RAS lines per SIMM 30, two CAS lines, one WE*, and 11 bits of address. The DSIMMs 72 are double sided, using TSOP DRAMs, and are spaced 300 mils apart. There are presently two variants of DSIMMs 72: a 16 megabyte version using 1Mb×4 DRAMs 74 and a 64 megabyte version using 4Mb×4 DRAMS. Each DSIMM 72 contains a buffer 75 to distribute the RAS-, CAS0-, CAS1-, WE-, and A<-0-11> signals to the DRAMs 74. The present memory system implementation uses 80 nanosecond DRAMs 74 to achieve 100 nanosecond data access time from RAS- generation. The memory controller 20 supports the following densities of DRAMs 74 on DSIMMs 72:

| RAM | Density | # of Rams | Capacity | Type |
|---|---|---|---|---|
| 1Mbit | (256K×4) | 36 | 4 MByte | ECC DRAM |
| 4Mbit | (1M×4) | 36 | 16 MByte | ECC DRAM |
| 16Mbit | (4M×4) | 36 | 64 MByte | ECC DRAM |

Although the present memory bus architecture supports two RAS lines per SIMM position, in the present implementation the RAS0 and RAS1 signals on the sockets for all SIMMs 30 are tied together on the motherboard, and the OE- is tied to ground on the DSIMM 72. Because the present architecture is arranged in full datapath width arrangements, DSIMMs 72 can be individually added one at a time, each DSIMM 72 having 144 bits of data and is double sided, using 36 DRAMs per DSIMM 72.

2. VSIMM

The present implementation of a VSIMM 32 contains thirty-two VRAMs 34, a video buffer 35, and a display interface 36. The video buffer 35 buffers RAS-, CAS-, WE-, the address bits ADDR[11:0] and the CBWs [15:0]. CBWs are used as ECC bits in DSIMMs 72, and as byte write enables in the VSIMMs 32. The video buffer 35 also provides refresh and reload circuitry for the VRAMs 34 on that VSIMM 32. The display interface 36 provides facility to multiplex the serial shift data from the VRAMs 34 and send the multiplexed data to a digital-to-analog converter (not shown) to form a red, green, and blue (RGB) output signal for the display monitor's color gun.

The memory controller 20 supports the following densities of VRAMs on VSIMMs 32:

| RAM | Density | # of Rams | Capacity | Type |
| --- | --- | --- | --- | --- |
| 2Mbit | (128K × 8) | 16 | 2 MByte | 128b VRAM |
| 1Mbit | (256K × 4) | 32 | 4 MByte | 128b VRAM |
| 2Mbit | (256K × 8) | 32 | 8 MByte | 256b VRAM |
| 4Mbit | (256K × 16) | 16/32 | 8/16 MByte | 256b VRAM |
| 4Mbit | (512K × 8) | 32 | 16 MByte | 256b VRAM |

In the present implementation of the memory bus, there are two versions of the VSIMM 32. There is a four megabyte version using 256K×4 VRAMs 34, and an eight megabyte version using 256K×8 VRAMS. The present implementation uses 80 nanosecond VRAMs 34 to provide for 100 nanosecond data access times following generation of RAS- by memory controller 20.

3. NVSIMM a. Timing Adjustment Between NVSIMM and Memory Controller

Figure 20A:
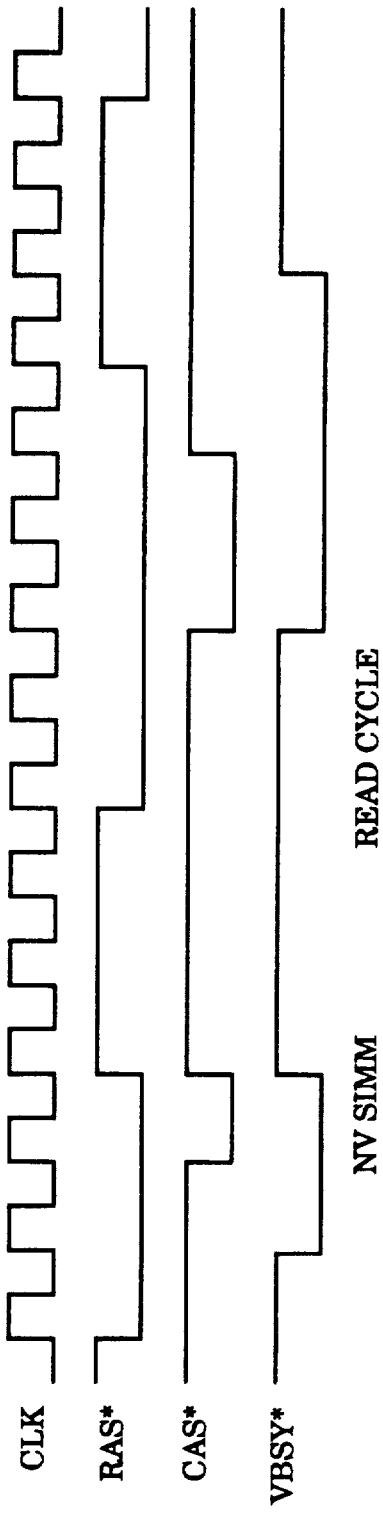
FIGS. 20a and 20b are exemplary timing diagrams illustrating respectively read and write accesses to an SRAM SIMM, according, to the protocol of the integrated data and memory bus.
Figure 20B:
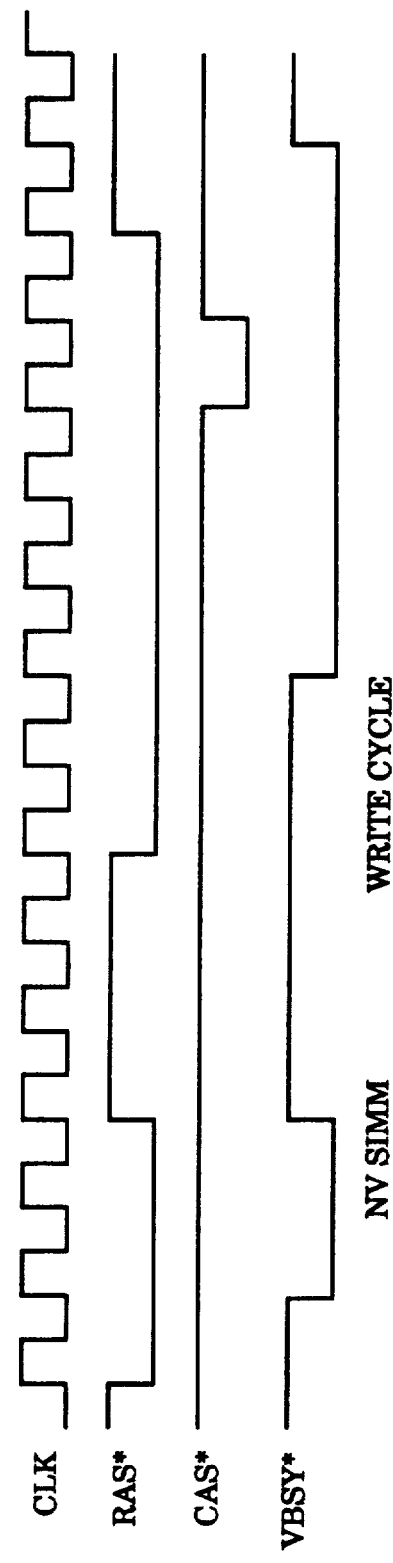

Since low power SRAMs 84 may be used in an NVSIMM 82, and also because the memory controller 20 operates at a faster speed with DRAM SIMMs, there must be some timing adjustment between the memory controller 20 and NVSIMM 82 for proper read and write operations. With reference to FIGS. 20a and 20b, at the beginning of each operation, whether it is a read or write, the memory controller 20 will be instructed to relinquish the NVSIMM when NVSIMM 82 asserts the VBSY- signal active low. This feature provides more clock cycles to NVSIMM 82 to complete its operation properly. VBSY- signal is synchronously asserted one clock cycle after a first RAS- by NVSIMM 82, and it is deasserted one clock cycle after the removal of the first CAS- signal. During the second cycle which is the retry cycle, VBSY- is asserted two clock cycles after the assertion of RAS- by NVSIMM and deasserted one clock cycle after RAS- is released. The data will be latched by the memory controller 20 at the rising edge of retry CAS- in a read operation, as shown in FIG. 20a.

b. NVSIMM Interface Timing

NVSIMM 82 operation, and all outputs from the NVSIMM 82, are synchronous to the rising edge of MCLK except SIRQ- (battery fail). There are four modes of access to the NVSIMM 82: write, read, read-modify-write, and refresh. During a refresh cycle, no operation is done on the NVSIMM 82. For both read and write operations, the NVSIMM 82 asserts VBSY- one cycle after assertion of RAS- signal. If at the next clock cycle no CAS- is asserted, as mentioned above then NVSIMM 82 is in a write operation. VBSY- is deasserted (high) one cycle after deassertion of retry RAS-.

As presently preferred, NVSIMM 82 can support either 8 byte or 16 byte transaction sizes, which is determined by CAS0- and CAS1-. NVSIMM 82 will go to a wait loop mode and ignores any refresh cycles, if a refresh cycle is detected before assertion of retry RAS- signal. NVSIMM 82 proceeds the cycle after the refresh is done. In the present embodiment, it takes 14 clock cycles, including precharge, for NVSIMM 82 to perform the read operation (FIG. 20a). Similarly, in the present embodiment it takes 16 clock cycles, including precharge, for NVSIMM 82 to perform the write operation, shown in FIG. 20b. There will be extra cycles if refresh occurs between first RAS- and retry RAS-. There will be extra cycles if refresh occurs between first RAS- and retry RAS-.

Finally, the SRAMs 84 do not require refresh cycle, and NVSIMM 82 will ignore all bus traffic associated with refresh during idle mode, read or write operations. NVSIMM 82 uses the Pin 92 (SIRQ-) on the memory bus 10 to report the status of its battery 88. The value of this signal is stored in one of the registers in a controller on the mother board. Software can access this register and verify the status of the battery. Each NVSIMM 82 may be equipped with its own exclusive battery fail signal (Pin 92).

The foregoing has described a bus architecture for integrated data and video memory. It is contemplated that changes and modifications may be made by one of ordinary skill in the art, to the device components and arrangements of elements of the present invention without departing from the spirit and scope of the invention.

We claim:

1. A computer bus structure, said computer bus structure comprising the elements of:

a processor bus, said processor bus coupled to at least one processor; and a memory bus coupled to said processor bus, said memory bus comprising, a plurality of address lines;

a plurality of data lines;

a plurality of control lines;

a plurality of memory module connectors, each of said memory module connectors coupled to said address, data, and control lines;

at least one data memory module coupled to one of said memory module connectors, said data memory module storing data;

at least one video data memory module coupled to one of said memory module connectors, said video data memory module storing video data; and a memory controller, said memory controller coupling said memory bus to said processor bus, said memory controller receiving memory requests over said processor bus and transmitting said memory requests to said data memory module and said video data memory module over said memory bus, said memory controller receiving register I/O requests over said processor bus and transmitting said register I/O requests to said video data memory module over said memory bus.

2. The computer bus structure as claimed in claim 1 wherein said data memory module comprises a single in-line memory module having a plurality of dynamic random access memory devices (DRAMs).

3. The computer bus structure as claimed in claim 1 wherein said video data memory module comprises a single in-line memory module having a plurality of video random access memory devices (VRAMs).

4. The bus structure as defined by claim 1 wherein said video data memory module is further coupled to a video display device, such that video data stored in said video memory module is directly provided to said video display device.

5. The bus structure as defined by claim 4 wherein said control signals includes a plurality of check bit write signals (CBWs) for transferring write enable signals to a plurality of video memory devices disposed on said video memory module.

6. The bus structure as defined by claim 5 wherein said write enable signals are valid when said CBWs are in a logical low state.

7. The bus structure as defined by claim 5 wherein said CBWs transfer a predetermined error correction code to a plurality of memory devices disposed on said data memory module.

8. The bus structure as defined by claim 7 wherein said memory devices disposed in said data memory module comprise dynamic RAM (DRAM).

9. The bus structure as defined by claim 7 wherein said data memory module and said video memory module have a data path width equal to a data path width of said memory bus.

10. The bus structure as defined by claim 9 wherein said data path width of said data memory module and said video memory module is 144 bits wide.

11. The bus structure as defined by claim 9 wherein said memory bus operates at a frequency substantially equal to 20 MHz.

12. The bus structure as defined by claim 9 wherein a plurality of processors are coupled to said processor bus.

13. The bus structure as defined by claim 12 wherein said memory bus control signals comprise a VBSY signal for indicating refresh cycles for said video memory devices, RAS and CAS signals for selecting said memory devices, Write Enable signals for indicating a write transfer, and IOSEL signals for accessing a register address space of said memory bus means.

14. The bus structure as defined by claim 13 wherein said VBSY signal decouples said memory controller means from said video memory module when said video memory devices require refresh or reloading.

15. A method for integrating data memory and video memory access requests in a computer system, said computer system comprising a processor bus having at least one processor and a memory bus coupled to said processor bus through a memory controller, said method comprising the steps of:
coupling at least one data memory module and at least one video memory module to said memory bus;
sensing a memory access request in said memory controller sent by a processor over said processor bus, said access request sent over said processor bus using a first protocol;
translating said memory access request received over said processor bus using said memory controller in a memory access request for said memory bus and transmitting said memory access request over said memory bus using a second protocol;
if said memory access request over said processor bus is targeted for said data memory module, said memory controller accessing said data memory module according to said memory access request received over said processor bus;
if said memory access request over said processor bus is targeted for said video memory module, said memory controller accessing said video memory module according to said memory access request received over said processor bus.
sensing a register I/O access request in said memory controller sent by a processor over said processor bus, said register I/O access request sent over said processor bus using said first protocol;
translating said register I/O access request received over said processor bus using said memory controller into a register I/O access request for said memory bus and transmitting said register I/O access request over said memory bus using said second protocol;

16. The method as claimed in claim 15, further comprising the steps of:
coupling a video display device to said video memory module;
transferring video data from said video memory module to said video display device.

17. The method as claimed in claim 15, wherein said second protocol comprises the step of transferring a plurality of check bit write signals (CBWs) to video memory devices disposed in said video memory module, each CBWs indicating a write enable for one of said video memory devices.

18. The method as claimed in claim 17, wherein said second protocol further comprises the step of transferring said CBWs to data memory devices disposed in said data memory module, said CBWs indicating a predetermined error correction code.

19. The method as claimed in claim 18, wherein said second protocol further comprises the step of transferring address signals for accessing said data memory module and said video memory module, a VBSY signal for indicating refresh cycles for said video memory devices, RAS and CAS signals for selecting said memory devices, Write Enable signals for indicating a write transfer over said memory bus, and IOSEL signals for accessing a register address space of said memory bus.

20. The method as claimed in claim 19, wherein said VBSY signal causes said access request over said memory bus to terminate and said access request over said memory bus is subsequently retried.

* * * * *

UNITED STATES PATENT AND TRADEMARK OFFICE
CERTIFICATE OF CORRECTION

PATENT NO. : 5,265,218
DATED : 11/23/93
INVENTOR(S) : Testa et al.

It is certified that error appears in the above-identified patent and that said Letters Patent is hereby corrected as shown below:

On the Title Page, Item [75]:

Inventors: delete "James Testa, Mountain View; Andreas Behtolsheim, Stanford; Edward Frank, Portola Valley; Trevor Creary, Moutain View, David Emberson, Santa Cruz; Shawn F. Storm; Bradley Hoffert, both of Mountain Valley, all of Calif." and insert --James Testa, Mountain View; Andreas Bechtolsheim, Stanford; Edward Frank, Portola Valley; Trevor Creary, Moutain View, David Emberson, Santa Cruz; Shawn F. Storm; Bradley Hoffert, both of Mountain View, all of Calif."--

Signed and Sealed this

Nineteenth Day of April, 1994

Attest:

BRUCE LEHMAN

Attesting Officer     Commissioner of Patents and Trademarks